United States Patent
Minagawa

(10) Patent No.: US 7,853,946 B2
(45) Date of Patent: Dec. 14, 2010

(54) INFORMATION PROCESSING APPARATUS, INFORMATION PROCESSING METHOD, AND CONTROL PROGRAM

(75) Inventor: Tomonori Minagawa, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1445 days.

(21) Appl. No.: 10/780,659

(22) Filed: Feb. 19, 2004

(65) Prior Publication Data

US 2004/0223182 A1 Nov. 11, 2004

(30) Foreign Application Priority Data

Feb. 28, 2003 (JP) ............................. 2003-053893
Jul. 31, 2003 (JP) ............................. 2003-205053

(51) Int. Cl.
G06F 9/445 (2006.01)
(52) U.S. Cl. ........................................ 717/178; 717/173
(58) Field of Classification Search ........................ None
See application file for complete search history.

(56) References Cited

U.S. PATENT DOCUMENTS

| 5,692,111 A * | 11/1997 | Marbry et al. ............. 358/1.15 |
| 5,983,277 A | 11/1999 | Heile et al. ................. 709/232 |
| 6,026,226 A | 2/2000 | Heile et al. ............. 395/500.13 |
| 6,607,314 B1 * | 8/2003 | McCannon et al. ........... 400/62 |
| 7,065,564 B2 | 6/2006 | Machida ..................... 709/222 |
| 2002/0083131 A1 * | 6/2002 | Machida ..................... 709/203 |
| 2002/0152430 A1 | 10/2002 | Akasaka et al. ............... 714/43 |
| 2003/0115302 A1 | 6/2003 | Teraoaka et al. ............ 709/221 |
| 2003/0200289 A1 * | 10/2003 | Kemp et al. ................. 709/221 |

FOREIGN PATENT DOCUMENTS

| JP | 10-032669 | 2/1998 |
| JP | 10-091369 | 4/1998 |
| JP | 10-222374 | 8/1998 |
| JP | 2001-001596 | 1/2001 |
| JP | 2001-75758 | 3/2001 |
| JP | 2001-222400 | 8/2001 |
| JP | 2001-251525 | 9/2001 |
| JP | 2001-325170 | 11/2001 |
| JP | 2002-175258 | 6/2002 |
| JP | 2002-251347 | 9/2002 |
| JP | 2003-016410 | 1/2003 |
| WO | WO 02/079968 A1 | 10/2002 |

* cited by examiner

*Primary Examiner*—Chuck O Kendall
(74) *Attorney, Agent, or Firm*—Fitzpatrick, Cella, Harper & Scinto

(57) ABSTRACT

An information processing method for an information processing apparatus which makes connection to a network to which at least a client apparatus and a printer are connected causes a computer to execute: a printer management step of managing information on the printer; a printer driver management step of managing a printer driver for the printer for which the information is managed; a client management step of managing the client apparatus; and an install step of installing the printer driver in the client apparatus which has issued an install request for the printer driver.

6 Claims, 38 Drawing Sheets

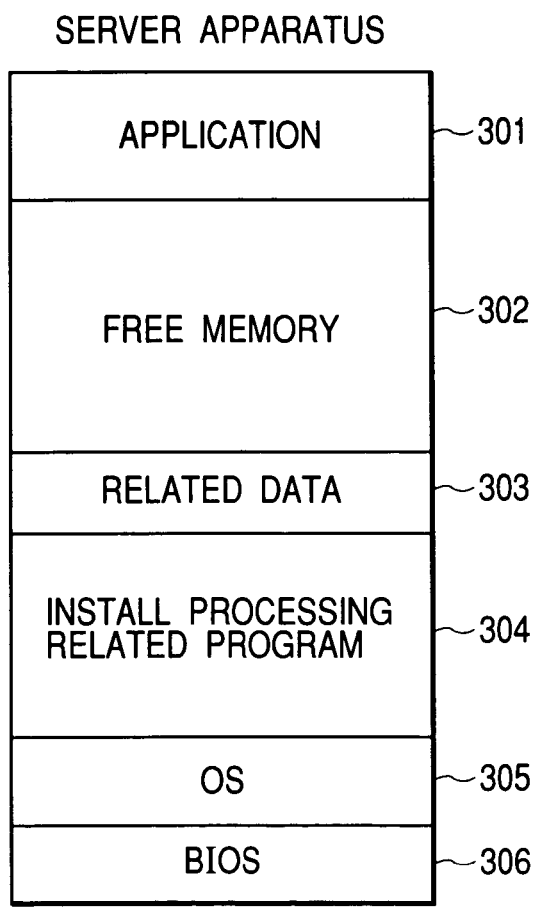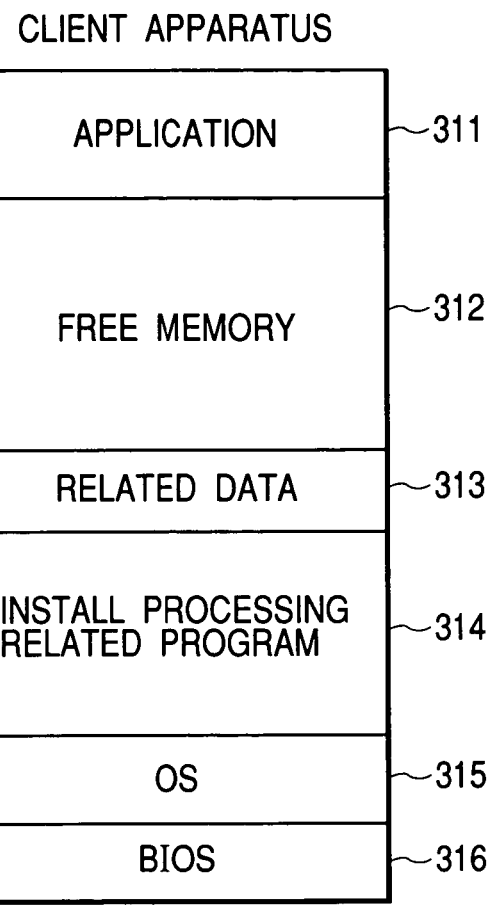

FIG. 15

| PRINTER NAME | PRINTER DRIVER FILE | IP ADDRESS |
|---|---|---|
| PRINTER A | xxxx.dll, xxxx.dll, ⋯ | 1xx.xxx.xxx.044 |
| PRINTER B | xxxx.dll, xxxx.dll, ⋯ | 1xx.xxx.xxx.128 |
| PRINTER C | xxxx.dll, xxxx.dll, ⋯ | 1xx.xxx.xxx.221 |

| EXT MODULE NAME | MODULE FILE |
|---|---|
| USER INTERFACE D | xxxx.dll |
| USER INTERFACE E | xxxx.dll |
| USER INTERFACE F | xxxx.dll |
| FUNC MODULE M | xxxx.dll |

| CLIENT NAME | IP ADDRESS |
|---|---|
| CLIENT A | IP_1xx.xxx.xxx.169 |
| CLIENT B | IP_1xx.xxx.xxx.154 |
| CLIENT C | IP_1xx.xxx.xxx.241 |
| CLIENT D | IP_1xx.xxx.xxx.035 |
| CLIENT E | IP_1xx.xxx.xxx.223 |

FIG. 19

| CLIENT | PRINTERS | EXT MODULE | INSTALL DIFFERENCE |
|---|---|---|---|
| CLIENT A | PRINTER A<br>PRINTER B<br>PRINTER C | USER INTERFACE D<br>FUNC MODULE M | <-- PRINTER C <-- USER INTERFACE D |
| CLIENT B | PRINTER A<br>PRINTER B | FUNC MODULE M | |
| CLIENT C | | | <-- ALL <-- ALL |
| ... | ... | ... | |

FIG. 20

| CLIENT | PRINTERS | EXT MODULE |
|---|---|---|
| CLIENT A | PRINTER A<br>PRINTER B<br>PRINTER C | USER INTERFACE D<br>FUNC MODULE M |
| CLIENT B | PRINTER A<br>PRINTER B<br>PRINTER C | USER INTERFACE D<br>FUNC MODULE M |
| CLIENT C | PRINTER A<br>PRINTER B<br>PRINTER C | USER INTERFACE D<br>FUNC MODULE M |
| ⋮ | ⋮ | ⋮ |

FIG. 22

| CLIENT | PRINTERS | EXT MODULE |
|---|---|---|
| CLIENT A | PRINTER A | |
| CLIENT B | PRINTER A<br>PRINTER B | USER INTERFACE E |
| CLIENT C | PRINTER A<br>PRINTER B<br>PRINTER C | USER INTERFACE D<br>FUNC MODULE M |
| CLIENT D | PRINTER B | USER INTERFACE E |
| CLIENT E | PRINTER C | USER INTERFACE F |

FIG. 23

| CLIENT | PRINTERS | EXT MODULE | | INSTALL DIFFERENCE |
|---|---|---|---|---|
| CLIENT A | PRINTER A | | | |
| CLIENT B | PRINTER A<br>PRINTER B | FUNC MODULE E | | |
| CLIENT C | PRINTER A | FUNC MODULE M | <-- PRINTER B<br><-- PRINTER C | <-- USER INTERFACE D |
| CLIENT D | | | <-- PRINTER B | <-- USER INTERFACE E |
| CLIENT E | PRINTER C | USER INTERFACE F | | |

FIG. 32

| CLIENT | PRINTER | FUNCTION |
|---|---|---|
| CLIENT A | PRINTER A | EXTENDED FUNCTION MODULE D |
| CLIENT B | PRINTER A<br>PRINTER B | EXTENDED FUNCTION MODULE E |
| CLIENT C | PRINTER A<br>PRINTER B<br>PRINTER C | EXTENDED FUNCTION MODULE D<br>EXTENDED FUNCTION MODULE E |
| CLIENT D | PRINTER B | EXTENDED FUNCTION MODULE E<br>EXTENDED FUNCTION MODULE F |
| CLIENT E | PRINTER C | |

801

INFORMATION PROCESSING APPARATUS, INFORMATION PROCESSING METHOD, AND CONTROL PROGRAM

BACKGROUND OF THE INVENTION

1. Field of the Invention

The present invention relates to a print processing system, and an information processing apparatus, a client apparatus, an information processing method, and a program which constitute the print processing system.

2. Related Background Art

In a conventional install method for a printer driver, in the case of an OS dependent system, for example, Windows (registered trademark), a user selects "addition of a printer" from a property of a printer and is caused to input necessary information according to a dialogue format, which is called wizard, and install a printer driver. In addition, there is also a method with which a user simply performs necessary minimum operations using an installer to thereby realize install of a printer driver. Further, in an installation operation with Point & Print using a print server, a mechanism for automatically delivering a printer driver from a server apparatus to a client apparatus exists on a server of Windows (registered trademark) NT/2000/XP.

Some host apparatuses provided with a printer driver load a dynamic link library, which provides data relating to print data, such as a printer to be connected, and functions provided in a printer driver of the printer, to an OS with plug-in.

In addition, if users install a printer driver in their own ways and make connection to a printer disorderly, it is likely for a malfunction to occur in a print processing system. If a printer manager (IT manager) installs the printer driver in client apparatuses in order to solve this problem, an extremely long time is required in the case in which there are many client apparatuses.

However, in conventional install methods, various problems occur because, in the case in which a user, such as a company, owns a large number of computers and has a large number of users (clients), work for causing all the clients to install a printer driver is required.

In addition, a device (printer) driver of a latest version is usually used in order to use a new function in a driver. However, updating and reinstalling of a driver require time and labor and, to make matters worse, since reboot may occur, essential business of the user may be adversely affected.

Further, in the Point & Print system using a print server, it is possible to install a printer driver in all the clients with automatic delivery of the printer driver. However, since the installation is carried out regardless of the state of the client apparatus side of the system, it is likely that the driver function changes regardless of the state of use of a user, or a mismatch occurs in a driver constitution to prevent the printer driver from operating normally.

SUMMARY OF THE INVENTION

The present invention has been devised in order to solve at least one of the above-described problems of the conventional technique, and it is an aspect of the present invention to provide a program install method, a program install apparatus, and a program install system which makes it possible to perform installation of a device driver for a printer or the like by a unit of function.

Moreover, it is another aspect of the present invention to provide a program install method, a program install apparatus, and a program install system with which a user is capable of installing an appropriate driver without depending upon knowledge of the user or the user himself/herself.

For example, the present invention discloses an information processing method for an information processing apparatus which makes connection to a network to which at least client apparatuses and a printer are connected, the information processing method causing a computer to execute: a printer management step of managing information on the printer; a printer driver management step of managing a printer driver for the printer for which the information is managed; a client management step of managing the client apparatuses; and an install step of installing the printer driver in the client apparatuses which have issued an install request for the printer driver.

Other features and advantages of the present invention will be apparent from the following description taken in conjunction with the accompanying drawings, in which like reference characters designate the same or similar parts throughout thereof.

BRIEF DESCRIPTION OF THE DRAWINGS

In the accompanying drawings:

FIG. 3A is a diagram showing a memory map of a control program for a server apparatus which has been loaded to a RAM 2 of a host computer 3000 in FIG. 2 and has become executable;

FIG. 3B is a diagram showing a memory map of a control program for a client apparatus which is loaded to the RAM 2 of the host computer 3000 in FIG. 2 and has become executable;

FIG. 15 is a diagram showing an example of a resource management table;

FIG. 19 is a diagram showing an example of an install state management table;

FIG. 20 is a diagram showing an example of an updated version of the install state management table shown in FIG. 19;

FIG. 22 is a diagram showing an example of a client management table which is created in the processing shown in FIG. 21;

FIG. 23 is a diagram showing an example of an install state management table;

FIG. 32 is a diagram showing an example of an information management table in the embodiment;

DESCRIPTION OF THE PREFERRED EMBODIMENTS

It is an object of the present invention to provide an apparatus and method to allow users to easily install a driver for a printer, which can be used in client apparatuses of the users, without requiring special knowledge. In order to realize this object, settings of a printer and a printer driver, which the respective client apparatuses can use, are prepared in advance in a print server, and installation and environmental setting are automatically performed with a request from a client user as a trigger. Here, this system is called pull type install of a printer driver.

In addition, a printer driver set is constituted by a combination of a core module and extended modules such that a change of a function of a driver can be performed simply by addition and update of this extended module, whereby update of a driver and creation of a customized driver set for specific users are facilitated. This system is called a plug-in type printer driver.

By combining these printer drivers, it becomes possible for both client users and an IT manager to perform installation of a printer driver in client apparatuses, and extension of functions and update of the printer driver with minimum man-hours. In addition, it is made possible to use a customized UI by replacement of a UI module only. Here, a customized driver set may be created, or only a UI module may be replaced after installation. Further, it is also made possible to use different UI for each user according to authority, level, or preference of the user.

Moreover, a module and a version installed in the respective client apparatuses on the print server are managed, whereby the IT manager can grasp a state of the respective client apparatuses. In addition, only a difference module is installed in the pull type installation after the installation, whereby it becomes possible to reduce the installation time and reduce the load on a network.

Embodiments of the present invention will be hereinafter described in detail with reference to the accompanying drawings.

Figure 1:
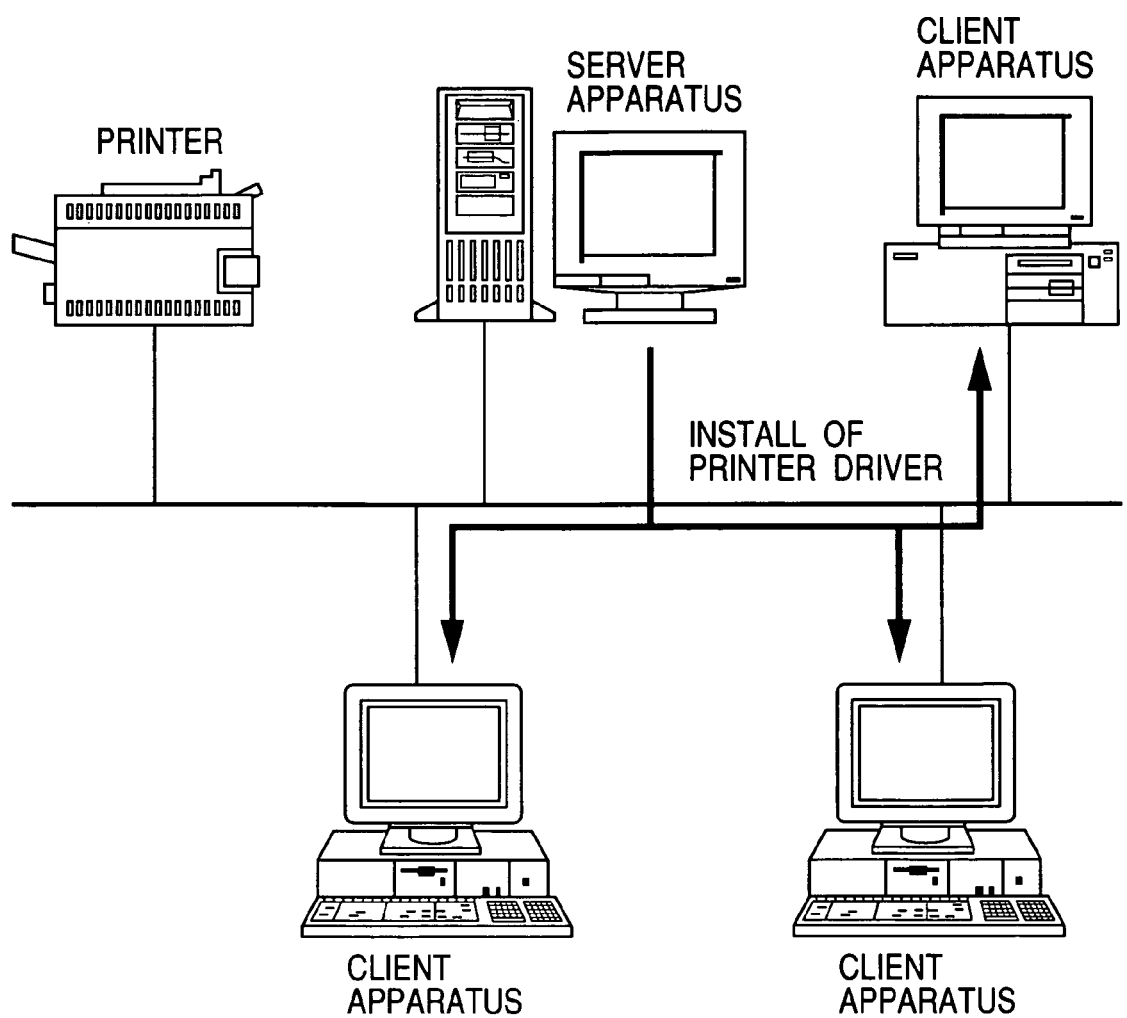
FIG. 1 is a diagram showing a schematic structure of a print processing system which carries out an information processing method in accordance with a first embodiment of the present invention.

FIG. 1 is a diagram showing a schematic structure of a print processing system which carries out an information processing method in accordance with a first embodiment of the present invention.

In the print processing system, a user interface install method serving as an information processing method is executed. The print processing system is constituted by connecting a server apparatus (information processing apparatus), a plurality of client apparatuses, and a printer on a network. A printer driver can be installed in the client apparatuses from the server apparatus. In addition, although not shown in the figure, a scanner, a digital camera, a facsimile, a mouse, a speaker, a sound source device, a telephone, a copying machine, and the like are also connected on the network.

Figure 2:
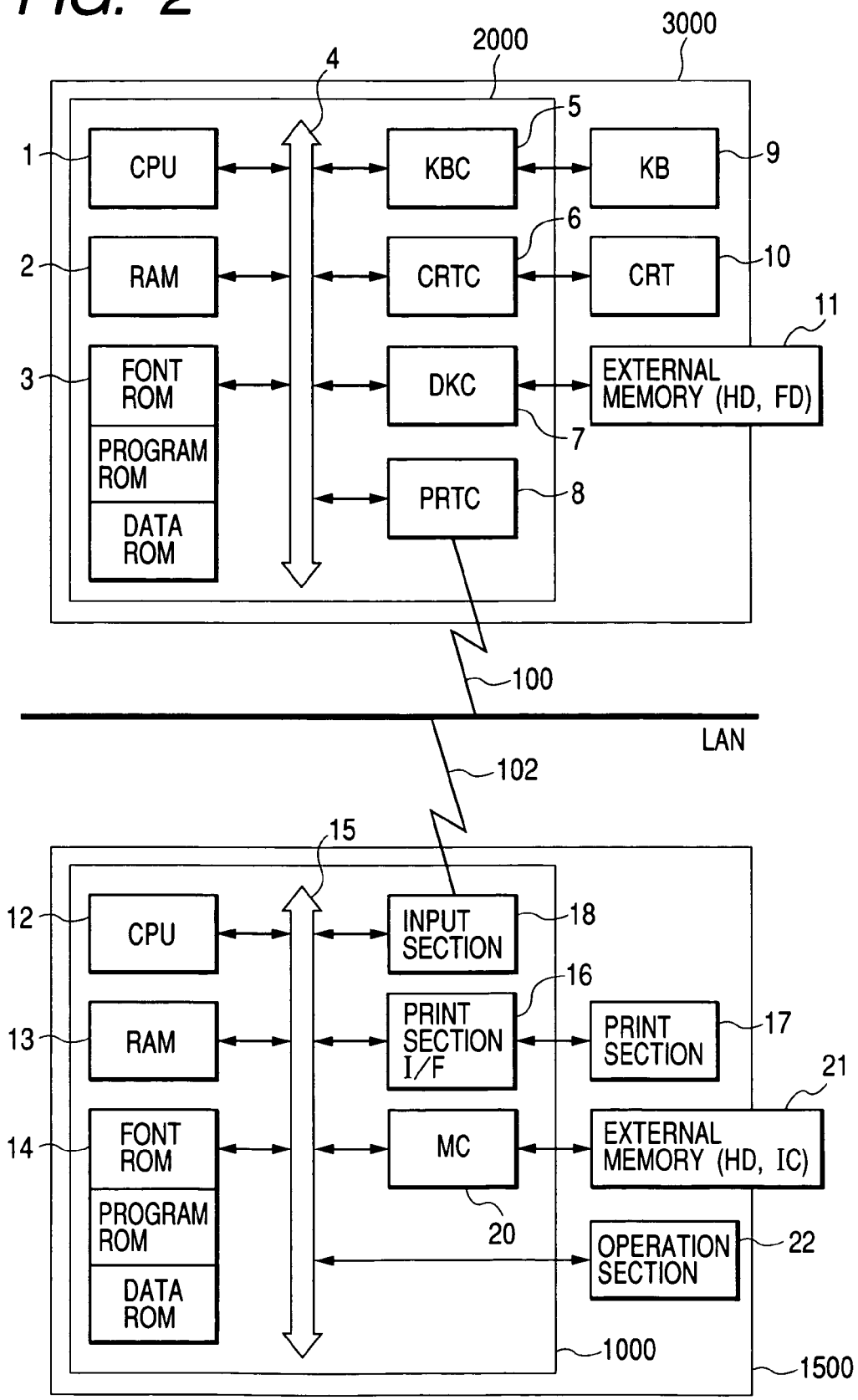
FIG. 2 is a block diagram illustrating a part of the structure of the print processing system in accordance with the first embodiment of the present invention.

FIG. 2 is a block diagram illustrating a part of the structure of the print processing system in accordance with the first embodiment of the present invention.

In the following description, the network for connecting a host computer and the printer may be any form such as a LAN, a WAN, a public line, or the Internet.

In FIG. 2, a printer 1500 and a host computer 3000 are connected via networks 100 and 102. The host computer 3000 has a structure in which a keyboard (KB) 9, a display (CRT) 10, and an external memory 11 such as a hard disk (HD) or a floppy (registered trademark) disk (FD), and the like are connected to a computer main body 2000. The structure of the host computer 3000 is common to the server apparatus and the client apparatuses in FIG. 1.

In the computer main body 2000, a CPU 1, a RAM 2, a ROM 3, a keyboard controller (KBC) 5, a CRT controller (CRTC) 6, a disk controller (DKC) 7, a printer controller (PRTC) 8, and the like are connected to each other via a system bus 4.

The CPU 1 executes processing of a document, in which figures, images, characters, tables (including spread sheet), and the like are mixed, on the basis of a document processing program or the like stored in a program ROM of the ROM 3 or the external memory 11. The CPU 1 also controls the respective devices connected to the system bus 4 comprehensively.

The RAM 2 functions as a main memory, a work area, and the like of the CPU 1.

The ROM 3 is constituted by a program ROM, a font ROM, and a data ROM. An operating system program (hereinafter referred to as OS) or the like, which is a control program for the CPU 1, is stored in the program ROM of the ROM 3 or the external memory 11. Font data or the like, which is used in the document processing, is stored in the font ROM of the ROM 3 or the external memory 11. Various data, which are used in performing the document processing or the like, are stored in the data ROM of the ROM 3 or the external memory 11.

The keyboard 9 and an unillustrated pointing device are connected to the KBC 5, and the KBC 5 controls key input from these devices. The CRT 10 is connected to the CRTC 6, and the CRTC 6 controls display of the CRT 10.

The DKC 7 controls access to the external memory 11, such as the hard disk (HD) or the floppy disk (FD) which stores a boot program, various applications, font data, user files, edition files, a printer control command generation program (hereinafter referred to as printer driver), and the like.

The PRTC 8 is connected to the printer 1500 via the network 100 and executes control processing for bi-directional communication with the printer 1500. Note that a command corresponding to a connection protocol may be added to a print job at the time of transmission. In addition, the command may be automatically added by the OS.

Note that the CPU 1 executes, for example, development (rasterize) processing of an outline font to a display information RAM set on the RAM 2 to make WYSIWYG on the CRT 10 possible.

In addition, the CPU 1 opens registered various windows on the basis of a command instructed by a not-shown mouse cursor or the like on the CRT 10 and executes various kinds of data processing. In executing printing, a user can open a window concerning setting for printing and perform setting for a print processing method with respect to a printer driver such as setting for a printer and selection of a print mode.

The printer 1500 has a structure in which a print section 17, an external memory 21 such as a HD, a FD or an IC card, an operation section 22, and the like are connected to a printer control section 1000.

In the printer control section 1000, a printer CPU 12, a RAM 13, a ROM 14, a print section I/F 16, an input section 18, and a memory controller (MC) 20 are connected to each other via a system bus 15.

The CPU 12 is capable of processing communication with the host computer 3000 via the input section 18 and is constituted so as to be able to communicate information or the like in the printer 1500 to the host computer 3000. Data received from the printer driver is stored in the RAM 13 and converted into an image signal by the control program. Note that interpretation of the command to be added according to the communication protocol is also performed by the control program.

The RAM 13 is a RAM which functions as a main memory, a work area, and the like of the CPU 12. A memory capacity of the RAM 13 can be extended by an option RAM to be connected to a not-shown extension port. Note that the RAM 13 is used for an output information development area, an environment data storage area, a NVRAM, and the like.

A control program or the like for the CPU 12 is stored in a program ROM of the ROM 14. The printer CPU 12 outputs an image signal serving as output information to the print section (printer engine) 17 via the print section I/F 16 connected to the system bus 15 on the basis of the control program or the like stored in this program ROM or a control program or the like stored in the external memory 21. Font data or the like, which is used in generating the output information, is stored in a font ROM of the ROM 14. Information or the like, which is used on the host computer 3000 in the case in which the printer is not provided with the external memory 21 such as a hard disk, is stored in a data ROM of the ROM 14.

Access of the external memory 21 such as a hard disk (HD), FD or an IC card is controlled by the MC 20. The external memory 21 is optionally connected to the printer 1500 and stores font data, an emulation program, form data, and the like.

In addition, on the operation section (operation panel) 22, switches for various operations, an LED display device, a liquid crystal panel, and the like are arranged. Further, the external memory 21 is not limited to one but may be plural, and may be constituted such that plural memories storing, in addition to an incorporated font, an option font card and a program for interpreting a printer control language of a different language system, can be connected. Moreover, the external memory 21 may include a unillustrated NVRAM so as to store printer mode setting information from the operation section 22.

FIG. 3A is a diagram showing a memory map of a control program for a server apparatus which has been loaded to a RAM 2 of a host computer 3000 in FIG. 2 and has become executable. FIG. 3B is a diagram showing a memory map of a control program for a client apparatus which has been loaded to the RAM 2 of the host computer 3000 in FIG. 2 and has become executable.

The pull type install program serving as a printer driver in this embodiment exists as a part of install processing related programs 304 and 314 of each of the server apparatus and the client apparatuses.

Figure 4:
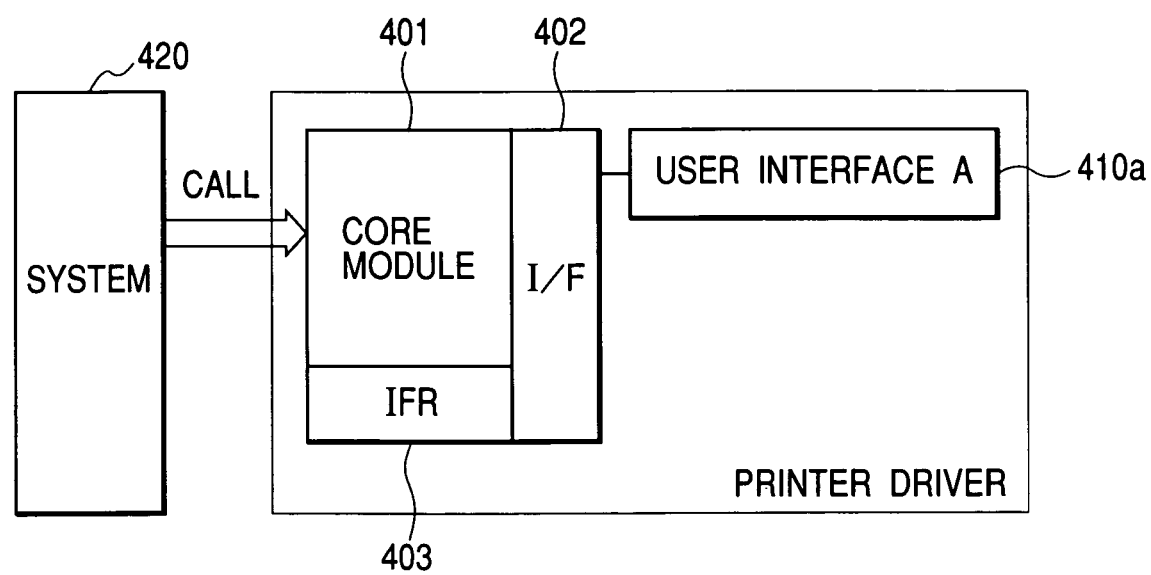
FIG. 4 is a diagram showing a structure of a printer driver and a relation between the printer driver and a system.

FIG. 4 is a diagram showing a structure of a printer driver and a relation between the printer driver and a system.

The printer driver is basically constituted by a core module 401 and an extended module 410x (x=a, b, . . . ). The extended module 410x is a general term for a UI (User Interface) module and a functional module. FIG. 4 shows a state in which only a UI module 410a is added as an extended module.

The core module 401 is a module which is directly called from a system 420 or a unillustrated application and performs basic print setting processing and print execution processing.

The extended module 410a is a replaceable functional module which performs specific processing and is called from the core module 401 via an interface I/F 402 as required. Note that the extended module 410x can be plugged in (added or replaced) using a tool (installer), whereby a function of the printer driver can be added and updated. In the case in which the extended module 410a is a UI module as shown in the figure, updating of and adding to the UI, and other similar operations, can be performed by a change and an addition of a module.

As a method of calling at the time when the core module 401 calls the extended module 410x (x is assumed to be, for example, a character string of a to z), for example, an "interface fixed system", an "interface registration system", "use of the COM", and the like are possible.

Among them, the "interface fixed system" is a system in which file names, function names, arguments, and the like in calling respective functions are defined. When the respective functions are required, the core module 401 calls the extended module 410x in accordance with the respective definitions and, if there is an extended module matching the requirement, uses processing of the extended module. The extended module 410x is created in accordance with the respective definitions.

In addition, the "interface registration system" is a system in which file names and function names in calling respective functions are registered in the I/F 402. When the respective functions are required, the core module 401 calls the extended module 410x using an interface registered in the I/F 402. The extended module 410x can be provided using an arbitrary file name or function name and can be mixed with other extended modules. In addition, when the extended module 410x is plugged in an existing printer driver set, the installer performs registration or update of an interface in the I/F 402 through an interface registration function IFR 403.

Further, the "use of the COM" is a system in which formats in calling respective functions are defined in advance, and a plug-in of an extension is registered in the system 420 as a COM component. It is also possible to include an entity of an extended module in a print server due to transparency of location which is a characteristic of the COM.

By adopting such a system, it becomes possible to call the extended module 410x and add or replace the extended module 410x. However, the methods of calling described above are only examples, and the present invention is not limited to these methods.

Note that the I/F 402 may function as a part of the core module 401 or may be an independent module. Similarly, the IFR 403 may be integral with the core module 401 or may be independent from the core module 401.

In addition, in the case in which the core module 401 has failed to call the extended module 410x, that is, in the case in which a pertinent extended module does not exist, common processing to be a base is performed in the core module 401, or processing is continued skipping pertinent function processing.

Further, it is assumed that the division of functions of the core module 401 and the extended module 410x is not specifically limited here. For example, it is also possible to perform the common processing to be a base in the core module 401 and make only specific individual functions (e.g., communication with devices, color processing, rendering, etc.) dependent as extended modules. Alternatively, it is also possible to use the core module 401 as a wrapper which processes only a call from the system 420 and placing a part managing the flow of the entire processing in the extended module 410x. The following embodiments will be described assuming division in various levels.

Note that the above-described mechanism is not limited to a printer driver but can also be applied to a print system including other utilities. Moreover, it is needless to mention that the mechanism is applicable to systems other than the print system.

Figure 5A:
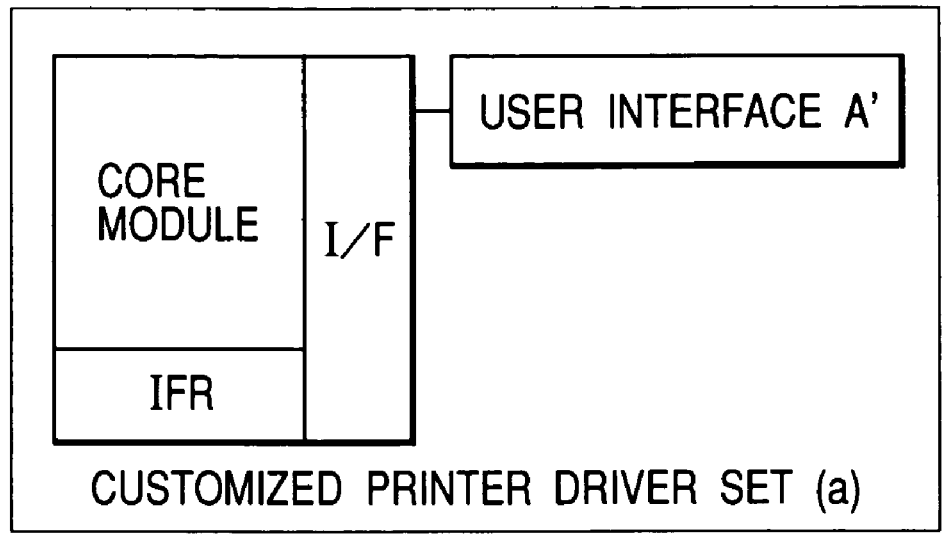
FIG. 5A is a diagram showing an example of a structure of a customized printer driver which is different from the structure shown in FIG. 4.
Figure 5B:
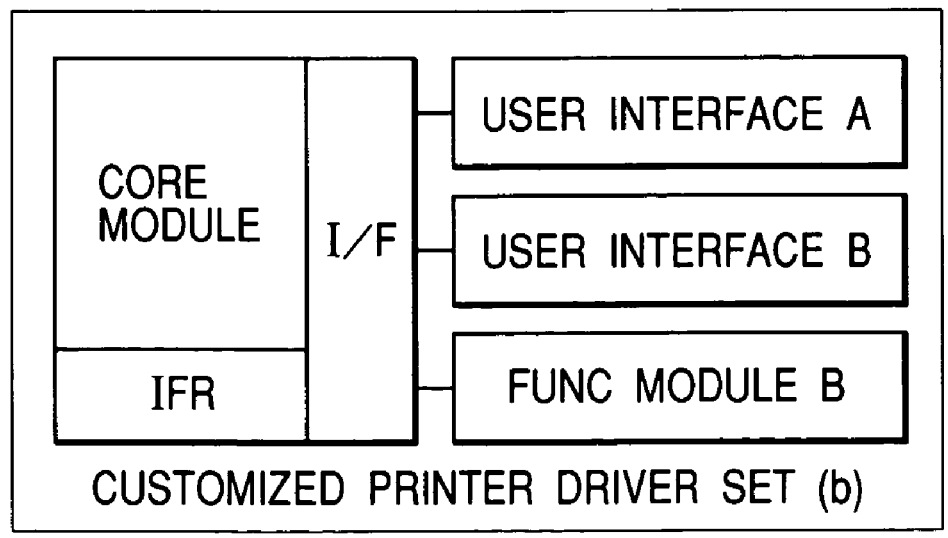
FIG. 5B is a diagram showing another example of a structure of a customized printer driver.

FIG. 5A is a diagram showing an example of a structure of a customized printer driver which is different from the structure shown in FIG. 4. FIG. 5B is a diagram showing another example of a structure of a customized printer driver.

The structure shown in FIG. 5A is different from the structure shown in FIG. 4 in that the user interface A in FIG. 4 is replaced with a user interface A'. This replacement means that even if I/Fs are the same, the contents of processing of the I/Fs can be changed. In the case of this example of UI replacement, only an operation system part can be changed without changing a print processing part.

In addition, in the structure shown in FIG. 5B, a user interface B and a Func module B are added to the structure shown in FIG. 4. The addition of the modules means that specific processing can be added and specific processing can be hooked. Concerning the UI section, a new function can be added and an operation section for controlling an added function can be added while keeping the conventional operation system.

In this way, by changing the combination of extended modules, a customized printer driver set, in which a special function is added or a specific function is changed, can be easily provided.

Figure 6:
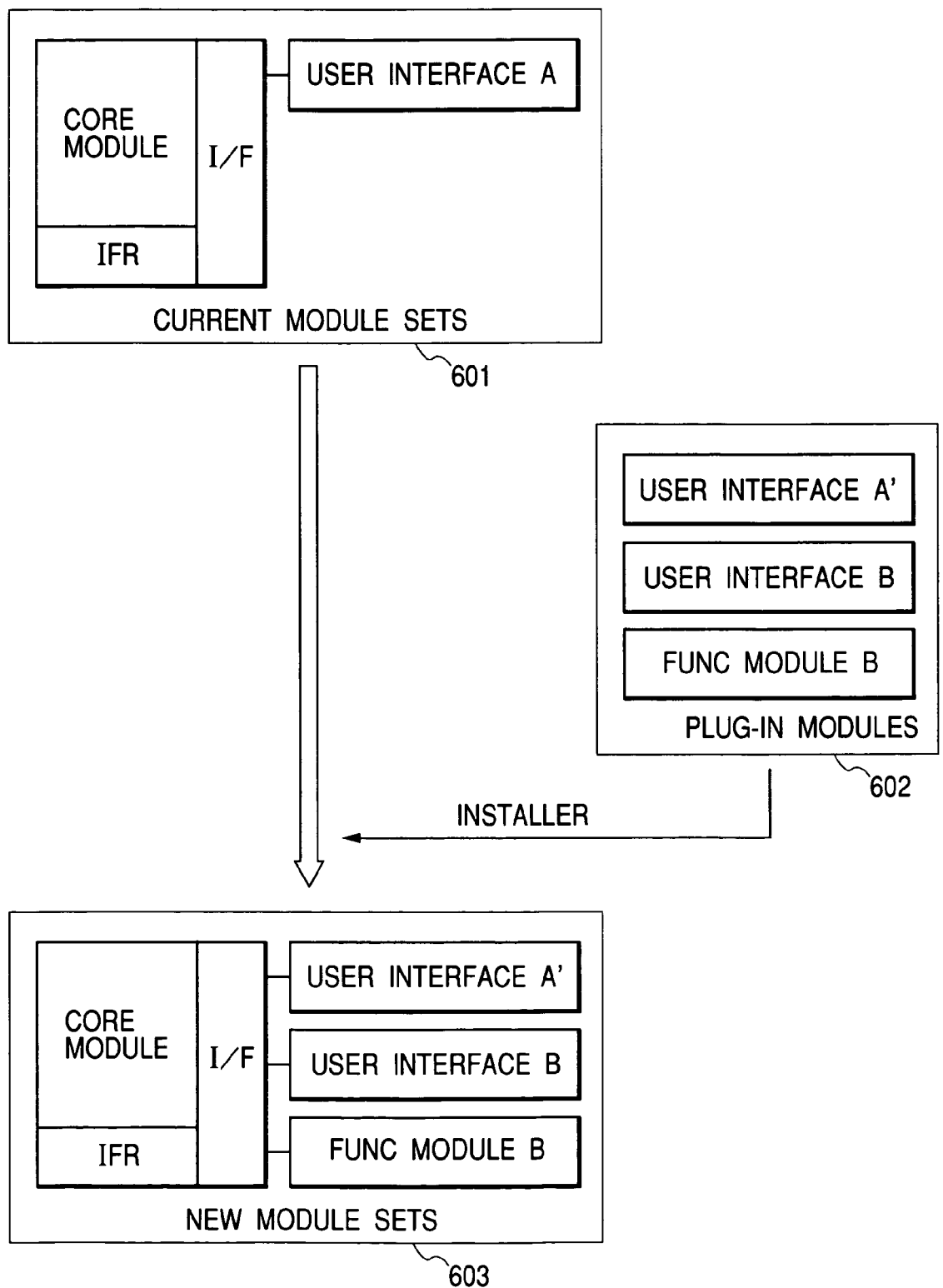
FIG. 6 is a diagram showing a change of a driver structure according to plug-in install.

FIG. 6 is a diagram showing a change of a driver structure according to a plug-in installation.

An example shown in FIG. 6 assumes processing for plugging three extended modules 602 consisting of a user interface A', user interface B, and a Func module B in an installed printer driver set 601 using an installer. Here, the user interface A' has the same interface as the user interface A and is replaced with the user interface A by the plug-in. In addition, the user interface B and the Func module B are added because there are no corresponding existing modules. As a result of the plug-in, the printer driver set has a structure indicated by 603.

Note that there are many cases in which a printer driver remains as loaded by a system or an application and cannot be replaced, and a reboot is required for update of the printer driver. However, in the case of this embodiment, since update of an extended module is possible even if a core module is loaded, update work of a printer driver set can be carried out without a reboot and without being affected by a system or an application.

In this way, by plugging in only an extended module, a function of a printer driver can be updated easily.

FIGS. 7 to 13 are diagrams showing a specific example of replacement of a UI.

Figure 7:
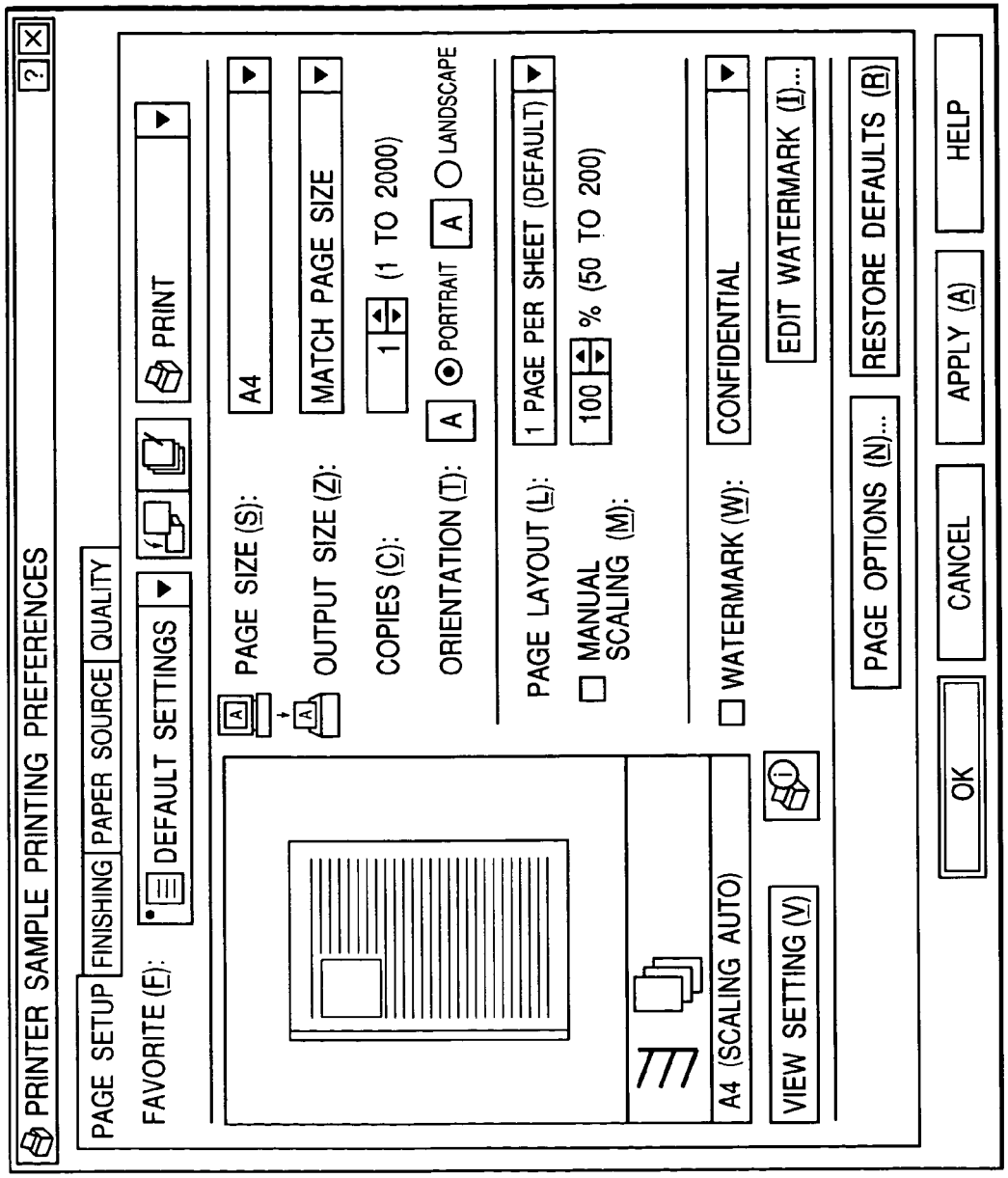
FIG. 7 is a diagram showing an example of a UI to be a base.
Figure 8:
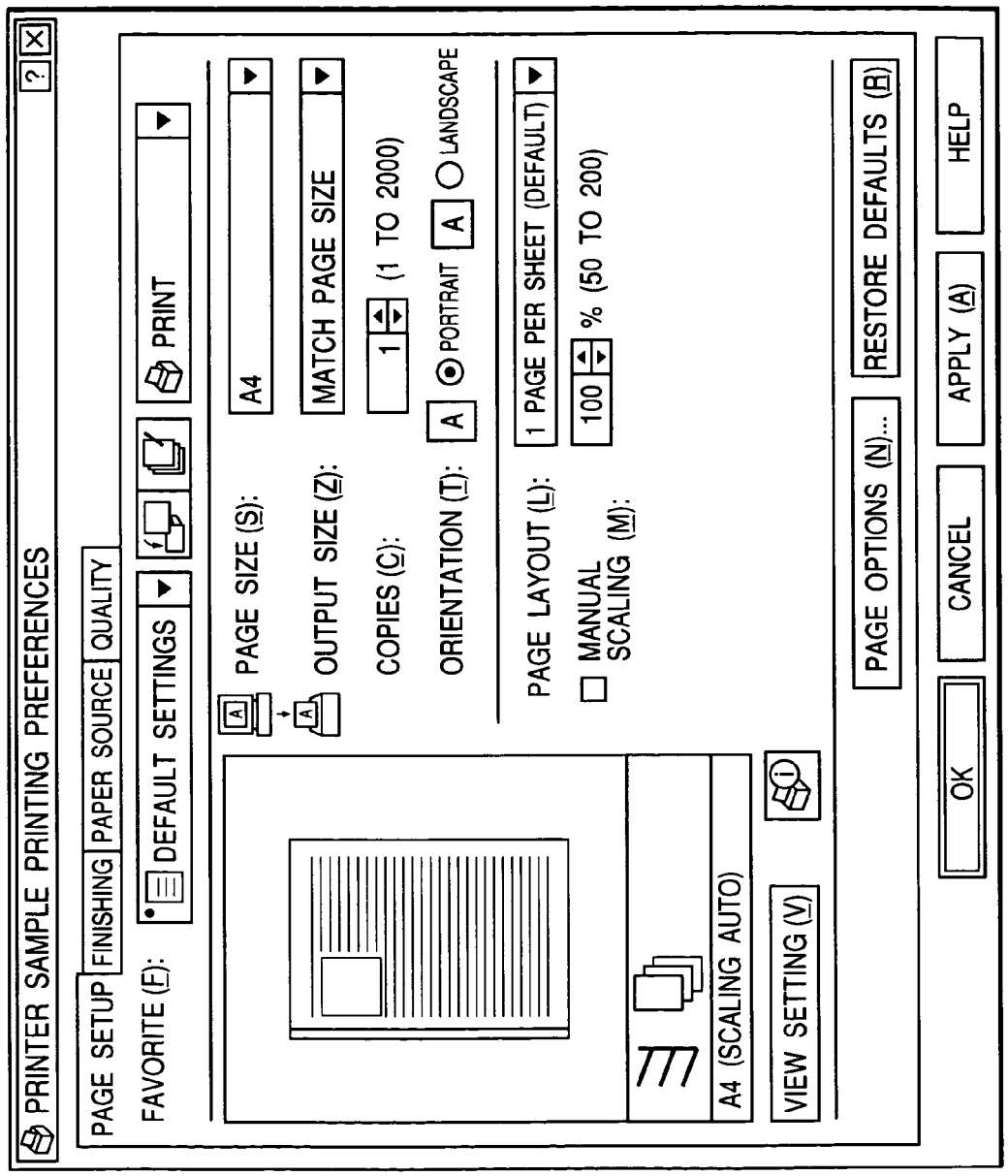
FIG. 8 is a diagram showing an example of a UI in the case in which the example of the UI in FIG. 7 is replaced with a UI module in which a function of a part of the example of the UI is masked.

FIG. 7 is a diagram showing an example of a UI to be a base. FIG. 8 is a diagram showing an example of a UI in the case in which the example of the UI in FIG. 7 is replaced with a UI module in which a function of a part the example of the UI is masked. In the example in FIG. 8, "Stamp" on the lower right part in the example in FIG. 7 is masked. This is equivalent to the user interface A' in FIG. 5A. It becomes possible to put limitations on general users to prevent the users from operating a specific function according to the replacement of a UI with such a masked UI.

Figure 9:
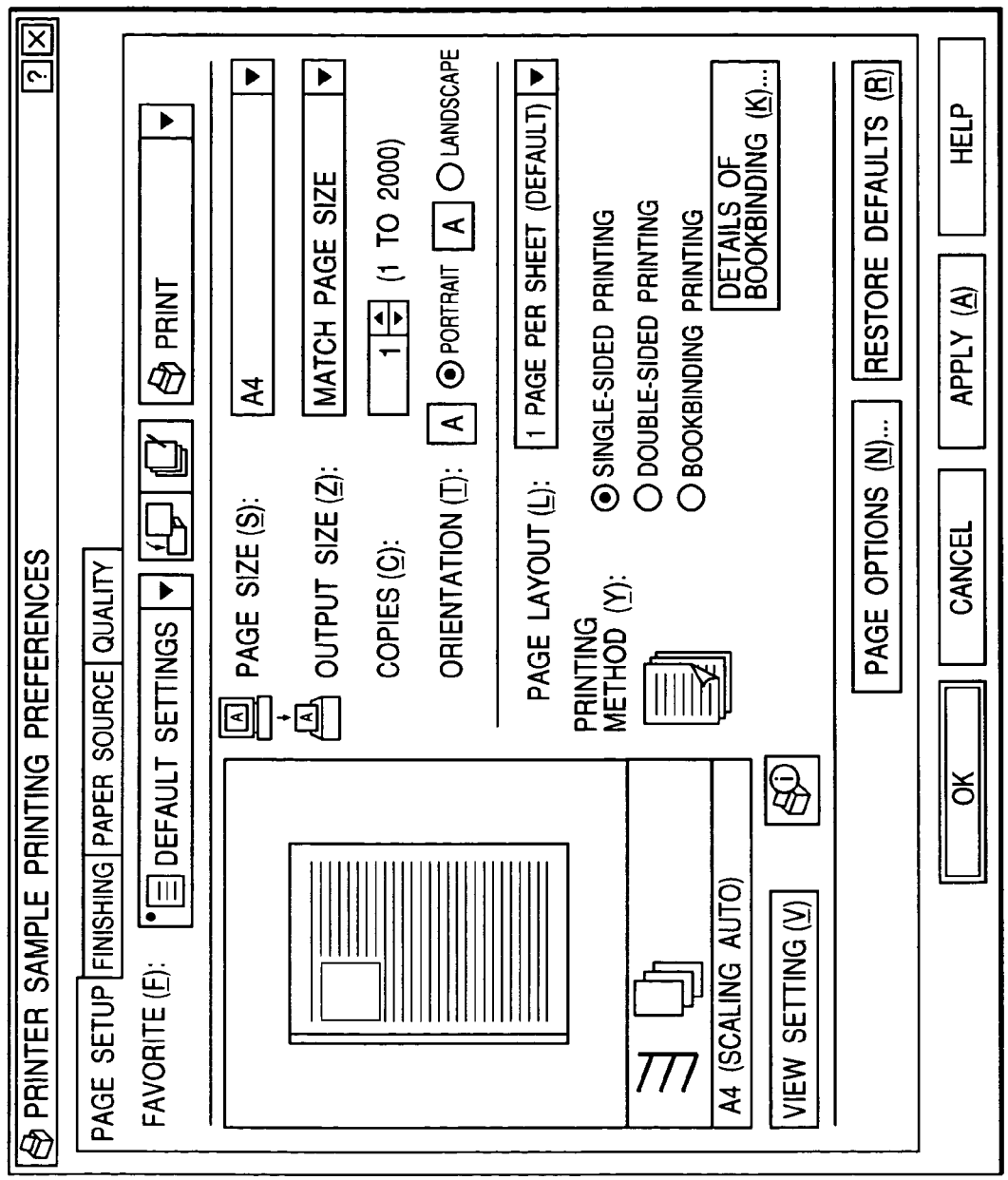
FIG. 9 is a diagram showing an example of a UI in the case in which the example of the UI in FIG. 7 is replaced with a UI module in which a function of a part of the example of the UI is replaced and customized.

FIG. 9 is a diagram showing an example of a UI in the case in which the example of the UI in FIG. 7 is replaced with a UI module in which a function of a part of the example of the UI is replaced and customized. In the example in FIG. 9, "Stamp" on the lower right part in the example in FIG. 7 is replaced with "Printing method". This is equivalent to the user interface A' in FIG. 5A. It becomes possible to arrange a frequently used function in a concentrated manner according to the replacement of a UI with such a customized UI.

Figure 10:
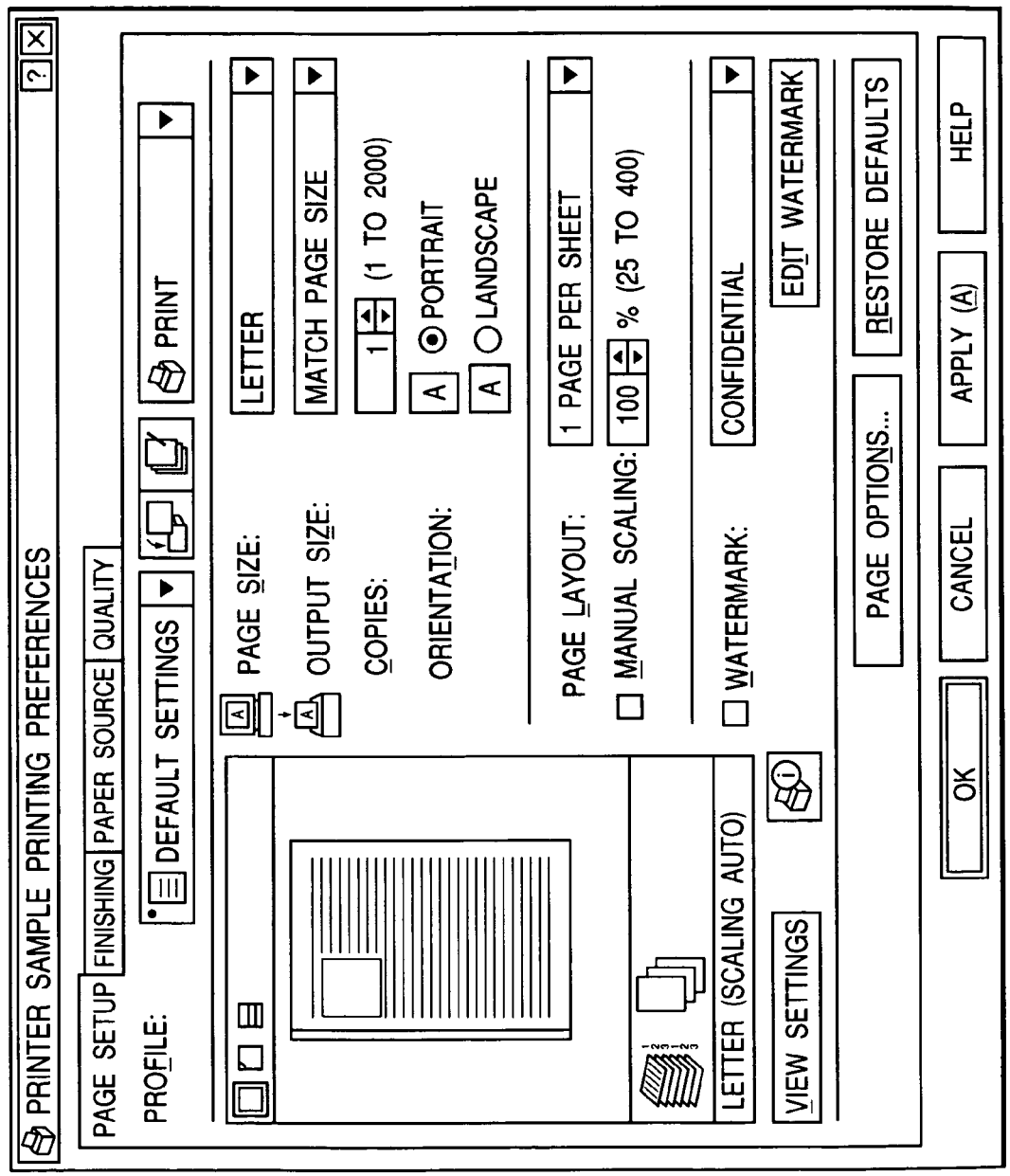
FIG. 10 is a diagram showing an example of a UI in the case in which the example of the UI in FIG. 7 is replaced with a UI module in which the example of the UI is localized to English representation.

FIG. 10 is a diagram showing an example of a UI in the case in which the example of the UI in FIG. 7 is replaced with a UI module in which the example of the UI is localized to English representation. This is equivalent to the user interface A' in FIG. 5A. It becomes possible to change only the display into a display of each language without changing a basic function according to the replacement of a UI into such a localized UI.

Figure 11:
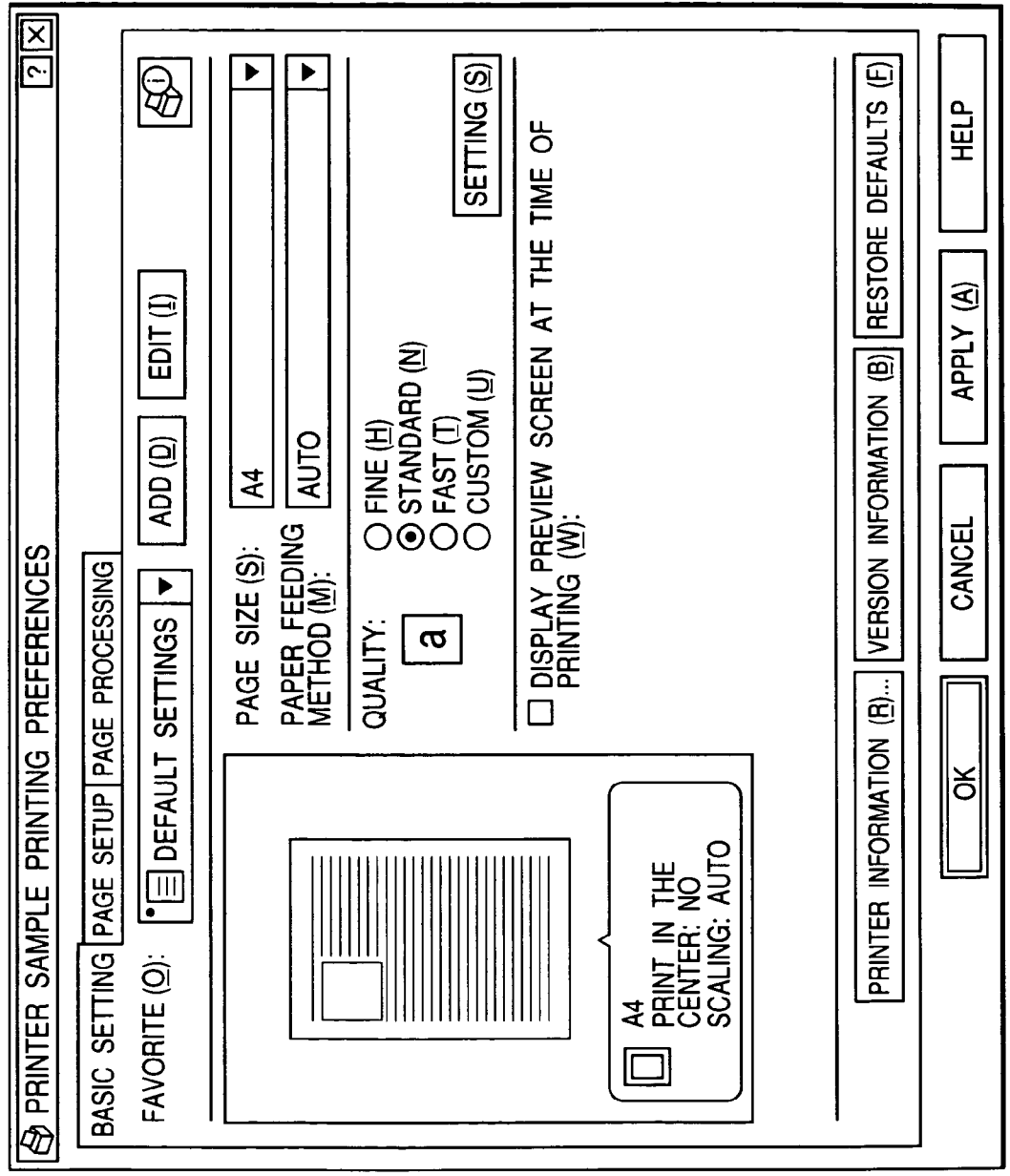
FIG. 11 is a diagram showing an example of a UI in the case in which the example of the UI in FIG. 7 is replaced with a UI module in which the example of the UI in FIG. 7 is simplified.

FIG. 11 is a diagram showing an example of a UI in the case in which the example of the UI in FIG. 7 is replaced with a UI module in which the example of the UI in FIG. 7 is simplified. This is equivalent to the user interface A' in FIG. 5A. It becomes easy to provide support or the like corresponding to a user level according to the replacement of a UT with such a simplified UI.

Figure 12:
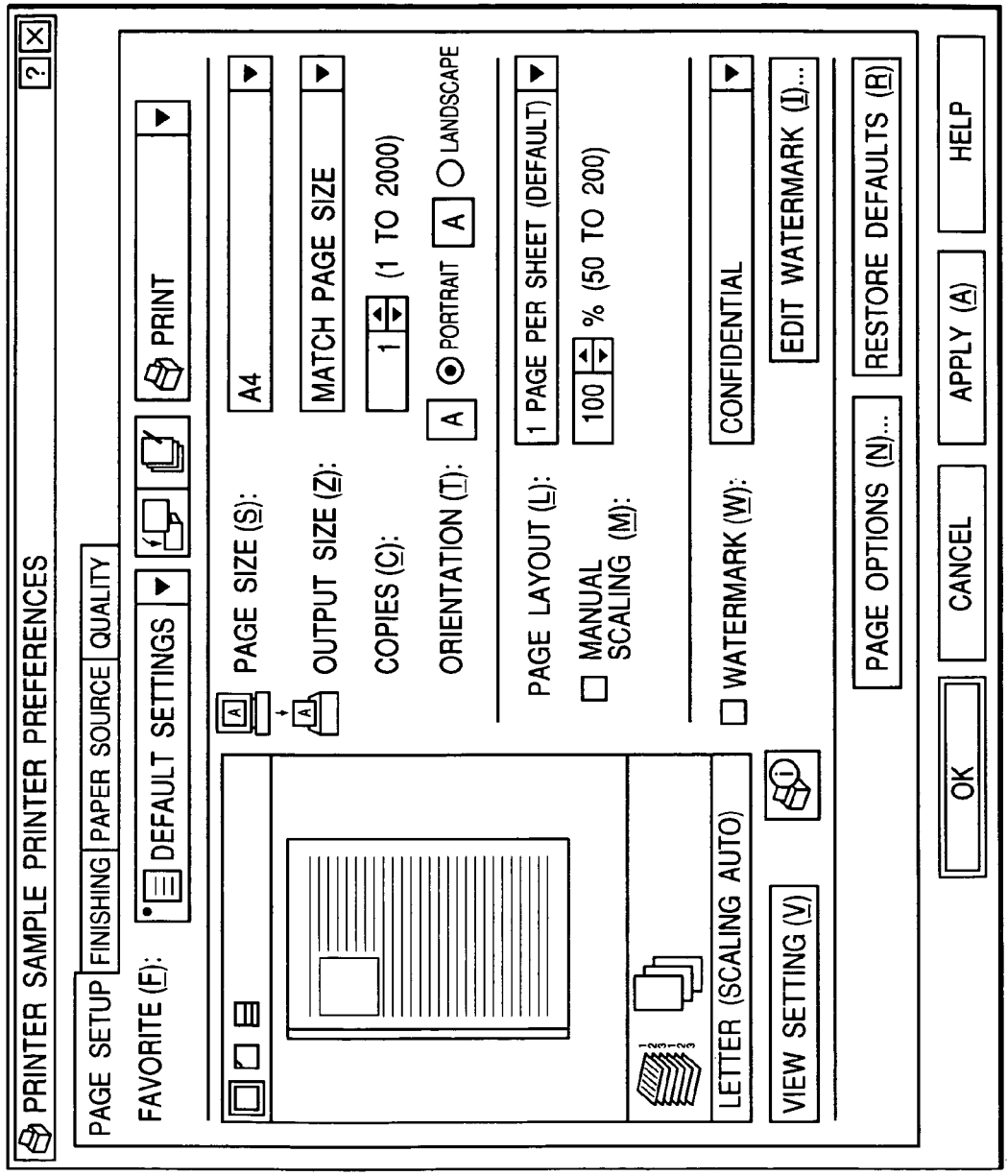
FIG. 12 is a diagram showing an example of a UI in the case in which the example of the UI in FIG. 7 is replaced with a UI module in which the example of the UI in FIG. 7 is changed to another shell.

FIG. 12 is a diagram showing an example of a UI in the case in which the example of the UI in FIG. 7 is replaced with a UI module in which the example of the UI in FIG. 7 is changed to another shell. This is equivalent to the user interface A' in FIG. 5A. In this way, according to the replacement of a UI with a UI of another shell, it becomes possible to selectively use a UI corresponding to preference of a user.

Figure 13:
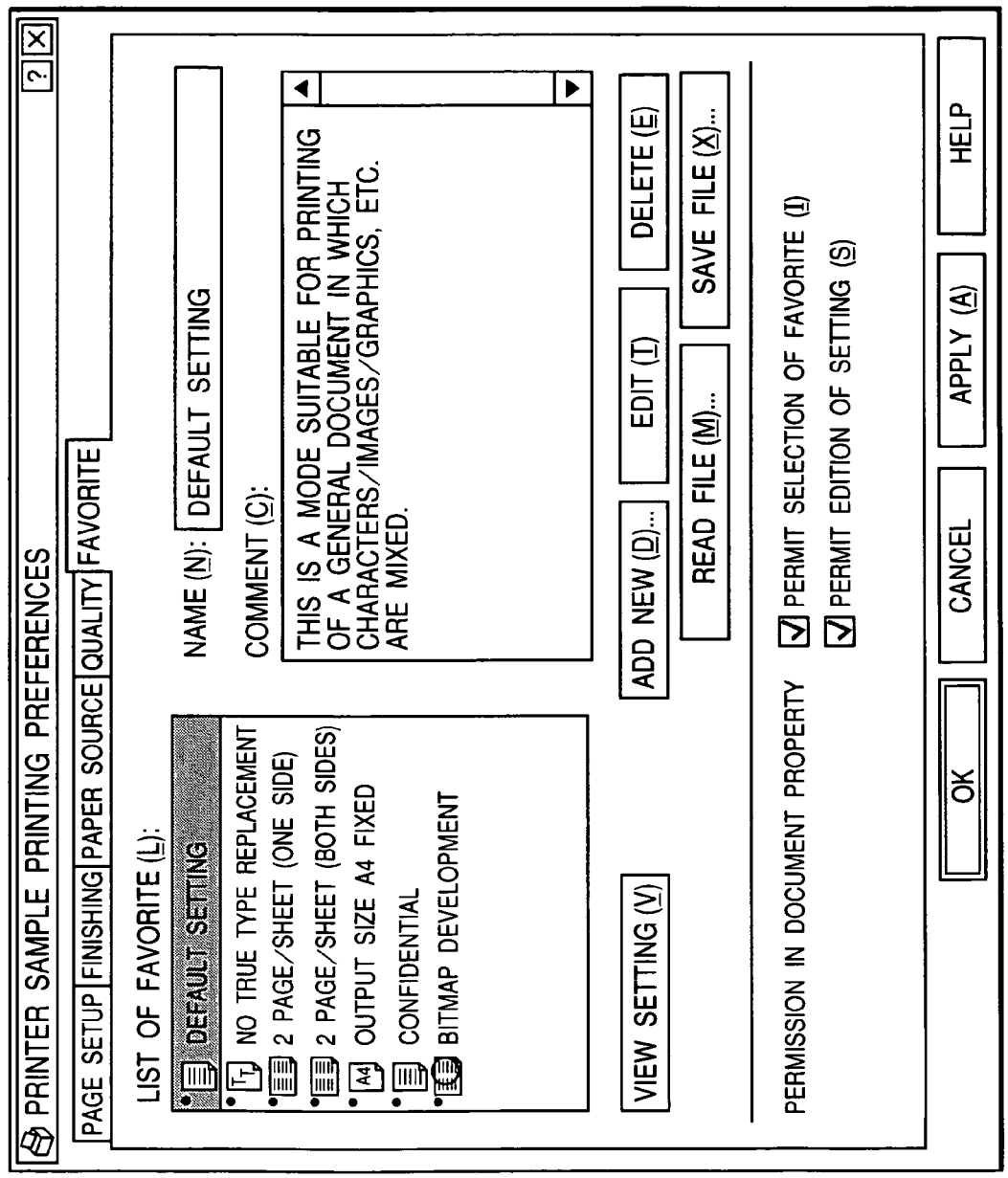
FIG. 13 is a diagram showing an example of a UI in the case in which the a UI module is added in order to add a new function to the example of the UI in FIG. 7.

FIG. 13 is a diagram showing an example of a UI in the case in which a UI module is added in order to add a new function to the example of the UI in FIG. 7. The added function is a function illustrated as "Favorite" of a fifth tab sheet. This is equivalent to the user interface B in FIG. 5B. In this way, according to the addition of a new function UI, a UI for operating a new function can be added while an existing UI is maintained. In the case in which a UI function is added, an actual processing module (here, the Func module B) corresponding to the UI function may be added.

Figure 14:
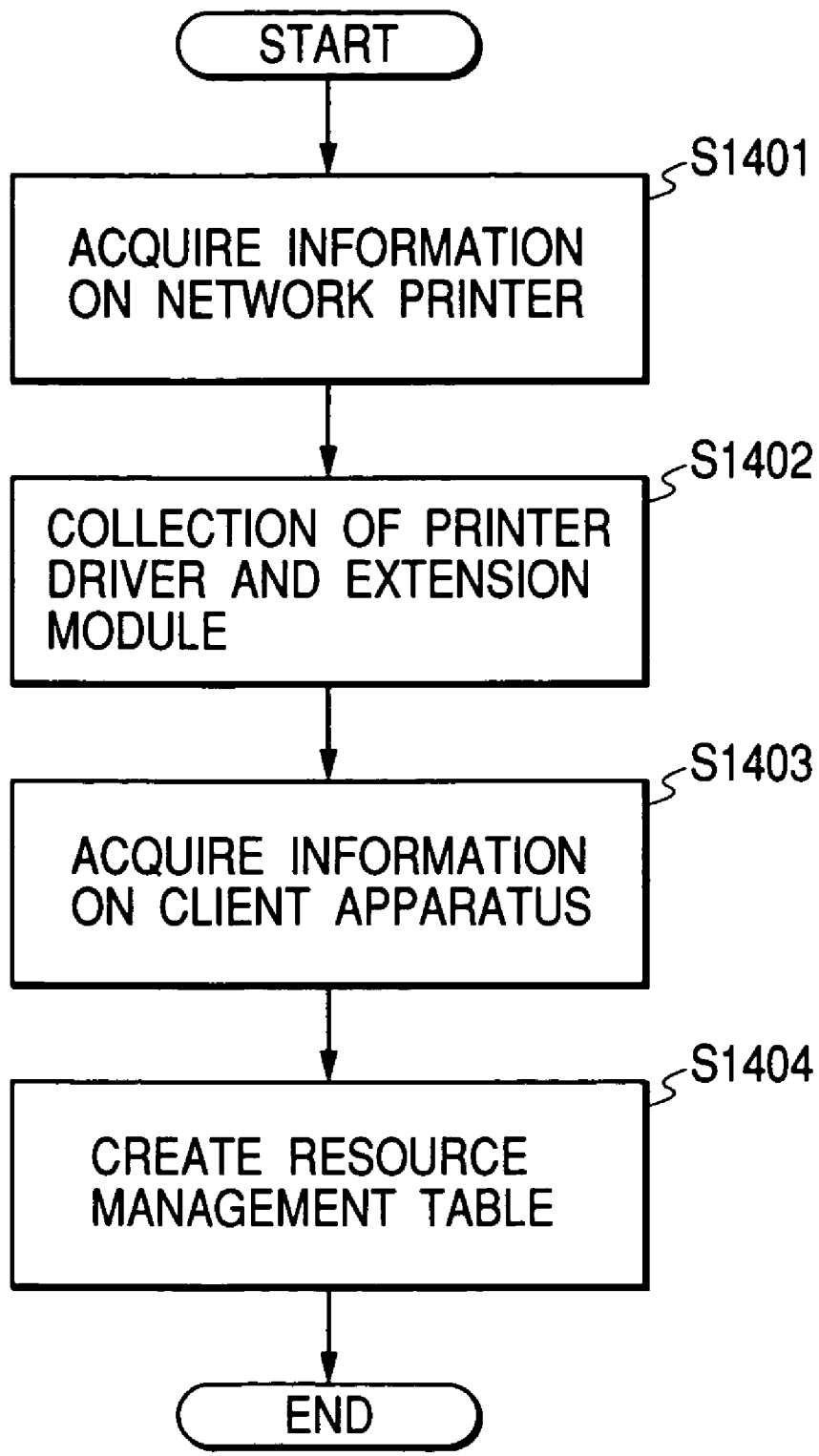
FIG. 14 is a flowchart showing preparation processing of information management in a server.

FIG. 14 is a flowchart showing preparation processing of information management in a server. For example, a program for the preparation processing is stored in an area of the application 301 of the server apparatus in FIG. 3A and is executed by the CPU on the server side in FIG. 2.

First, in step S1401, the server searches information on a printer connected to a network and acquires the information. Next, in step S1402, the server collects the environment such as an output port and a pertinent printer driver and also collects an extended module if necessary. The server establishes a driver set, which should be installed in client apparatuses and manages the driver set.

Next, in step S1403, the server creates a management list of client apparatuses connected to the network. Here, an IT manager may register client apparatuses to be objects of management, or the server may automatically collect information on all client apparatuses existing under control and set the client apparatuses as objects of management.

Next, in step S1404, the server creates a resource management table as illustrated in FIG. 15. Here, the resource management table includes a list of information such as printers, extended modules, and client apparatuses which are managed by the server. This is an example showing a state in which storage locations and file names of printer drivers, which will be required in the respective printers, IP addresses of output destinations, and the like are managed in a printer management table, storage locations and file names of modules corresponding to each extension are managed in an extended module management table, and IP addresses of the respective client apparatuses are managed in a client management table. These tables are collectively referred to as the resource management table.

According to the above processing, the server comes into a state in which the server can manage the printers and the client apparatuses. The processing of FIG. 14 is carried out at the time of establishment of a system, the addition of a printer, the upgrading of a printer driver, the addition of a function, the addition of a client apparatus, and the like.

Figure 16:
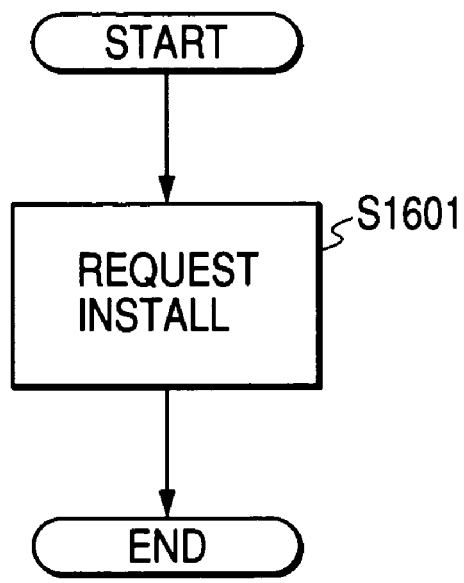
FIG. 16 is a flowchart showing pull install processing in a client apparatus.

FIG. 16 is a flowchart showing pull install processing in a client apparatus. A program for the pull install processing is stored in an application area 311 in FIG. 3B and is executed by the CPU on the client side in FIG. 2.

Figure 17:
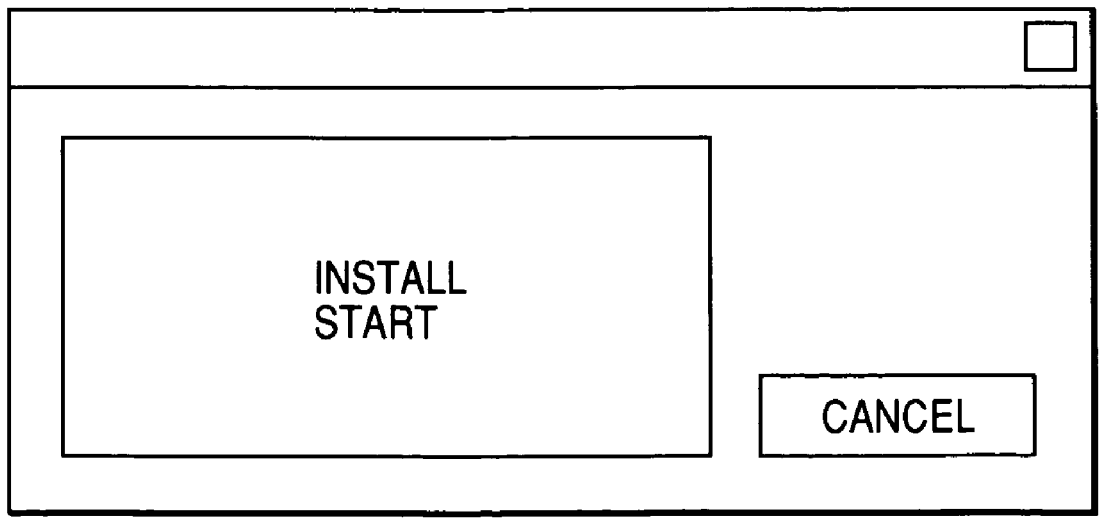
FIG. 17 is a diagram showing an example of a UI for executing pull install.

In step S1601, the client apparatus issues an install request to the server. FIG. 17 shows an example of a UI for causing a user to execute pull install which is displayed on the client apparatus at this point. The user can send an install request message to the server by depressing an Install Start button. Install processing after the transmission of the install request message is performed on the server side which has received the request message.

Figure 18:
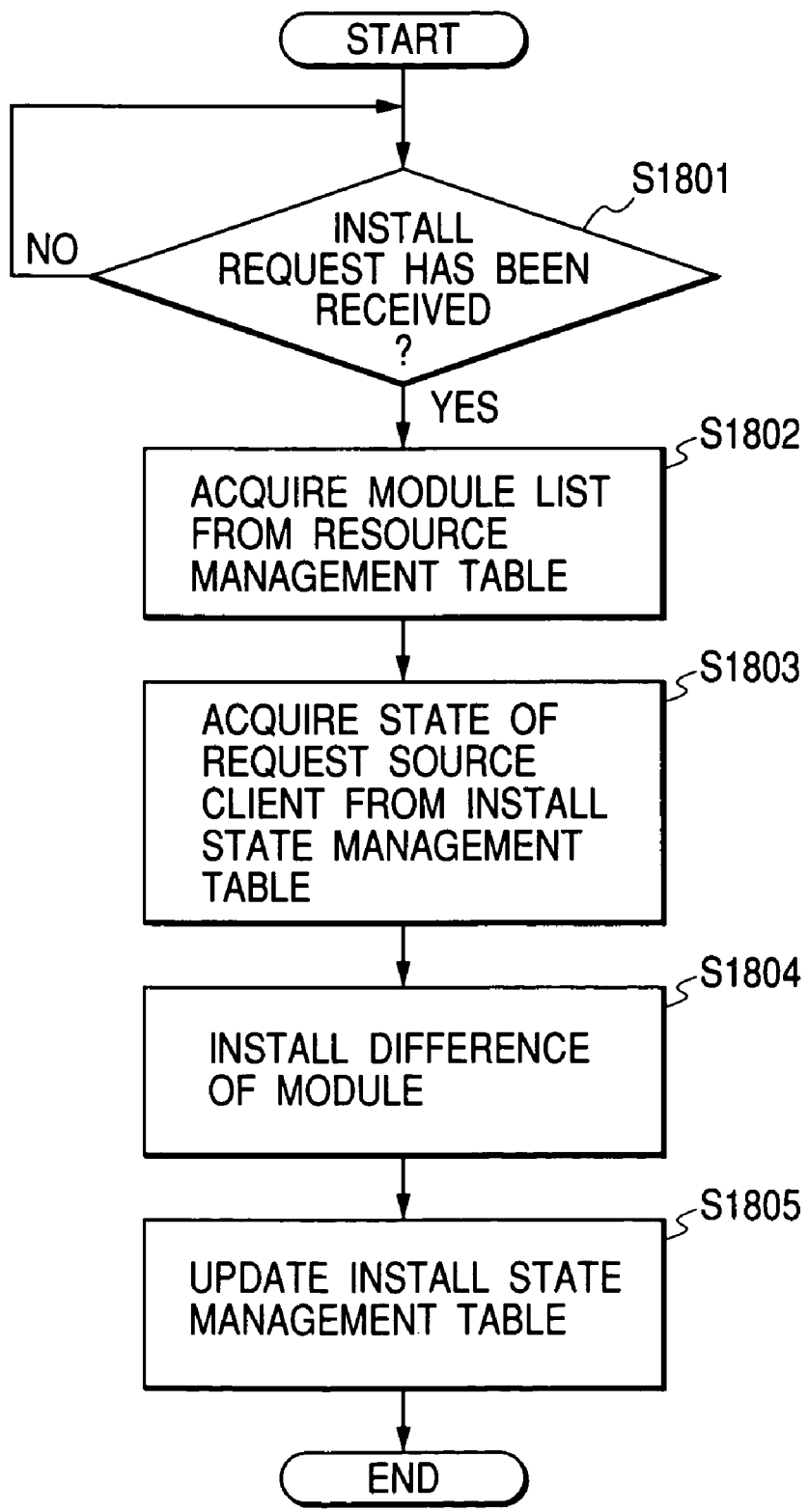
FIG. 18 is a flowchart showing pull install processing which is performed by a server in response to a request from a client apparatus.

FIG. 18 is a flowchart showing pull install processing which is performed by a server in response to a request from a client apparatus. A program for the pull install processing stored in an area 301 in the server apparatus in FIG. 3 is executed by the CPU on the server side in FIG. 2.

First, in step S1801, the server repeats a determination of whether or not an install request has been received until the install request is received from the client apparatus. In the case in which the install request from the client apparatus has been received, in step S1802, the server acquires a list of modules from the resource management table (see FIG. 15) and confirms information on a module which should be installed. Note that, in this embodiment, as an example, printers A, B and C, a user interface D, and a Func module M are assumed to constitute a module set which is an object of install.

Next, in step S1803, the server reads out an install state management table as illustrated in FIG. 19. The install state management table is a table for server management in which information, such as plural client apparatuses, which are objects of management, a list of modules which have already been installed in the respective client apparatuses, and versions of the modules, is recorded. The server confirms an install state of a request source client apparatus by reading out this install state management table. Note that, in the install state management table, a blank table is created anew at the time of establishment of a system and updated every time a module is installed in the client apparatus, whereby a latest install state is maintained.

The server determines a difference of a module from the information acquired in steps S1802 and S1803 and installs only the module of the difference in the request source client apparatus in step S1804. For example, in the case in which the request source client is the client B, it is seen from the install state management table shown in FIG. 19 that the printers A and B have been installed as printers and the Func module M has been installed as an extended module. Therefore, install (plug-in) of the printer C and the user interface D, which are differences, is performed.

In the case in which the request source is the client C, since no module is installed before the request, full install including a core module is performed. Note that, since the client A is in a state of a latest version, new processing is not performed for the client A even if an install request is issued.

The server acquires the module to be installed with reference to the resource management table. In addition, the server also performs environment setting such as an output port at the time of install.

After the installation has finished, in step S1805, the server updates the install state management table. In the case in which the install requests from the clients B and C are satisfied, the install state management table is updated as shown in FIG. 20.

As described above, the pull install in the client apparatus is completed.

Next, a user interface install method in accordance with a second embodiment of the present invention will be described. Note that, since the system and the like for carrying out the method are the same as those described in the first embodiment, descriptions of the system and the like will be omitted.

The first embodiment describes the example in which the same printer and extension are installed in all the client apparatuses. However, there are some cases in which management for each user is required, such as a case in which users on different floors are managed and a case in which it is desired to change a usable printer depending upon contents of a job.

As an example of such cases, a method in which an IT manager classifies and sets a usable printer and an extended module for each user will be described.

Figure 21:
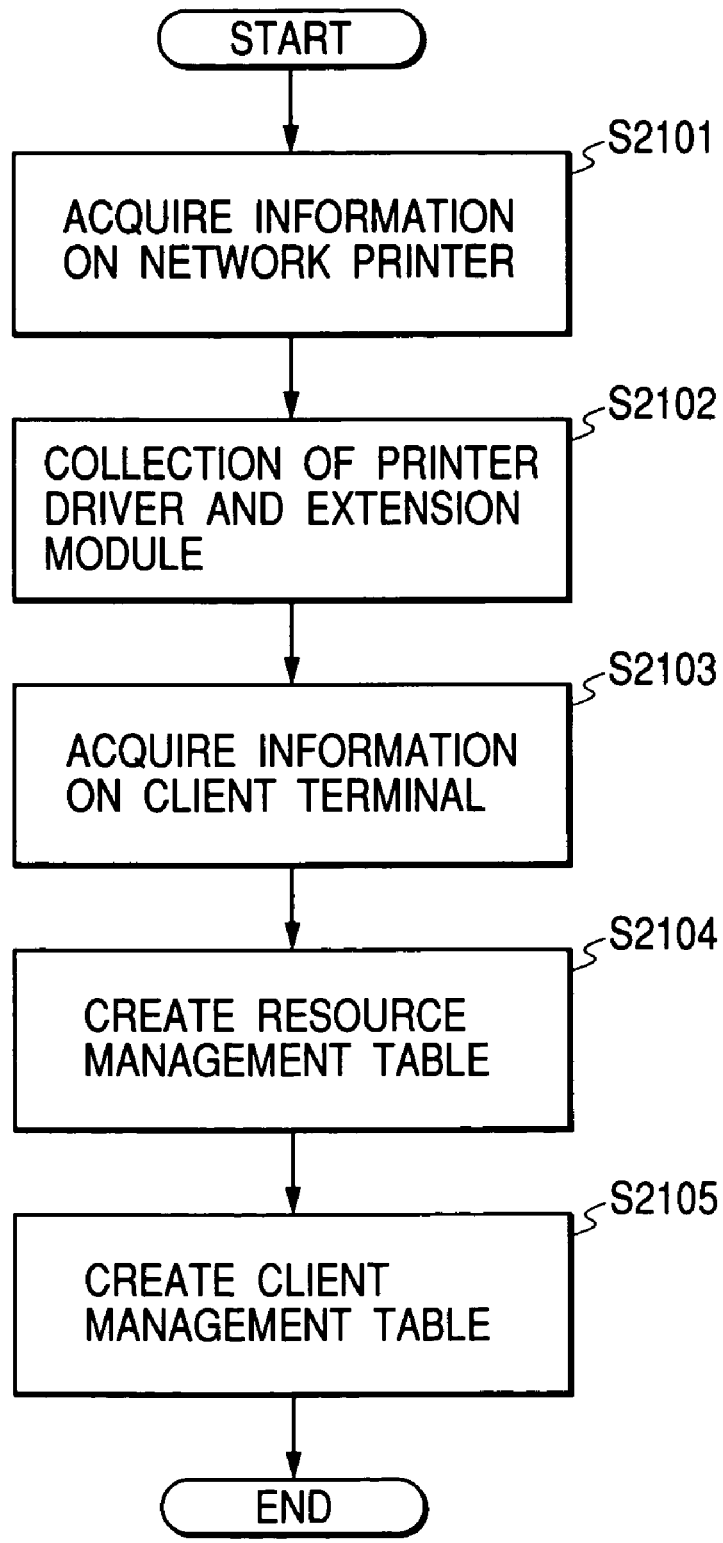
FIG. 21 is a flowchart showing processing in a server for printer management by an IT manager.

FIG. 21 is a flowchart showing processing in a server for printer management by the IT manager. A program for the processing is stored in the area 301 in FIG. 3 and is executed by the CPU on the server side in FIG. 2.

Since steps S2101 to S2104 are the same as steps S1401 to S1404 in FIG. 14, descriptions of the steps will be omitted.

After creating a resource management table in step S2104 in the same manner as in step S1404, in step S2105, the server creates a client management table as illustrated in FIG. 22. This client management table is created for managing printers and extended modules which respective client apparatuses are allowed to use.

Separately from the client management table, an IT manager can create a client management table. This will be described with reference to FIG. 24.

Figure 24:
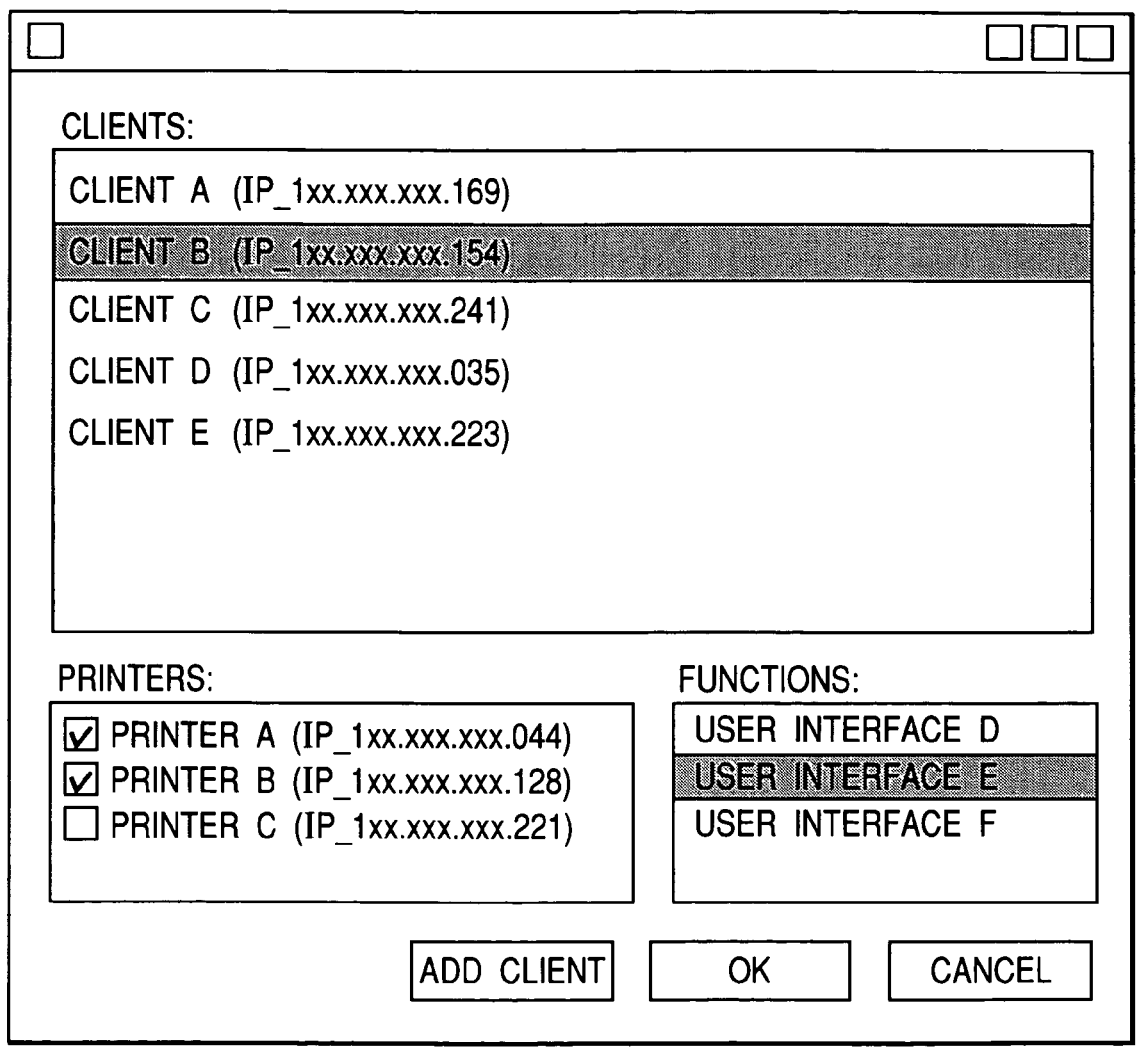
FIG. 24 is a diagram showing an example of a UI which is displayed when a client management table is created.

FIG. 24 is a diagram showing an example of a UI which is displayed when a client management table is created.

Here, first, if there is an existing client management table, the IT manager reads and displays the contents of the client management table (i.e., setting for each of present client apparatuses). When the IT manager selects an arbitrary client apparatus in a Clients column, a printer and an extended module, which the client apparatus is allowed to use, are displayed as a selection state in lists of Printers and Functions columns, respectively. The IT manager can update the list by changing the columns. In addition, the IT manager can confirm states of the respective client apparatuses by changing the client apparatus in the Clients column. At the time of first setting, since no allocation is made in all the columns, it is set from the start which printer and function are allowed to be installed in which client apparatus. Note that the addition of a client apparatus to be an object of management may be performed on this UI.

An install request from a client apparatus and processing of a server with respect to the install request are basically the same as the processing according to the processing flow shown in FIGS. 16 and 18 used in the description of the first embodiment. However, in this embodiment, the installation of a difference of a module in step S1804 is installation of a difference found by comparing the install state management table and the client management table shown in FIG. 22.

FIG. 23 is a diagram showing an example of an install state management table.

In the case in which contents of the present install state management table are in the illustrated state, the server compares the tables of FIGS. 22 and 23 in step S1804, whereby the printers B and C and the user interface D are installed in the case in which an install request is issued from the client C, and the printer B and the user interface E are installed in the case in which an install request is issued from the client D. Note that, since the clients A, B and E are in a latest state, processing is not performed even if an install request is issued from these client apparatuses.

The pull install managed for each client apparatus is completed as described above.

Next, a user interface install method in accordance with a third embodiment will be described. Note that, since a system and the like carrying out the method are the same as those described in the first embodiment, descriptions of the system and the like will be omitted.

In the second embodiment, limitation for each client apparatus is performed on the server. However, in this embodiment, such limitation is not performed on a server, and usable printers and extended modules are simply managed and, on the other hand, printers and extended modules required by client users are selected and used.

Figure 25:
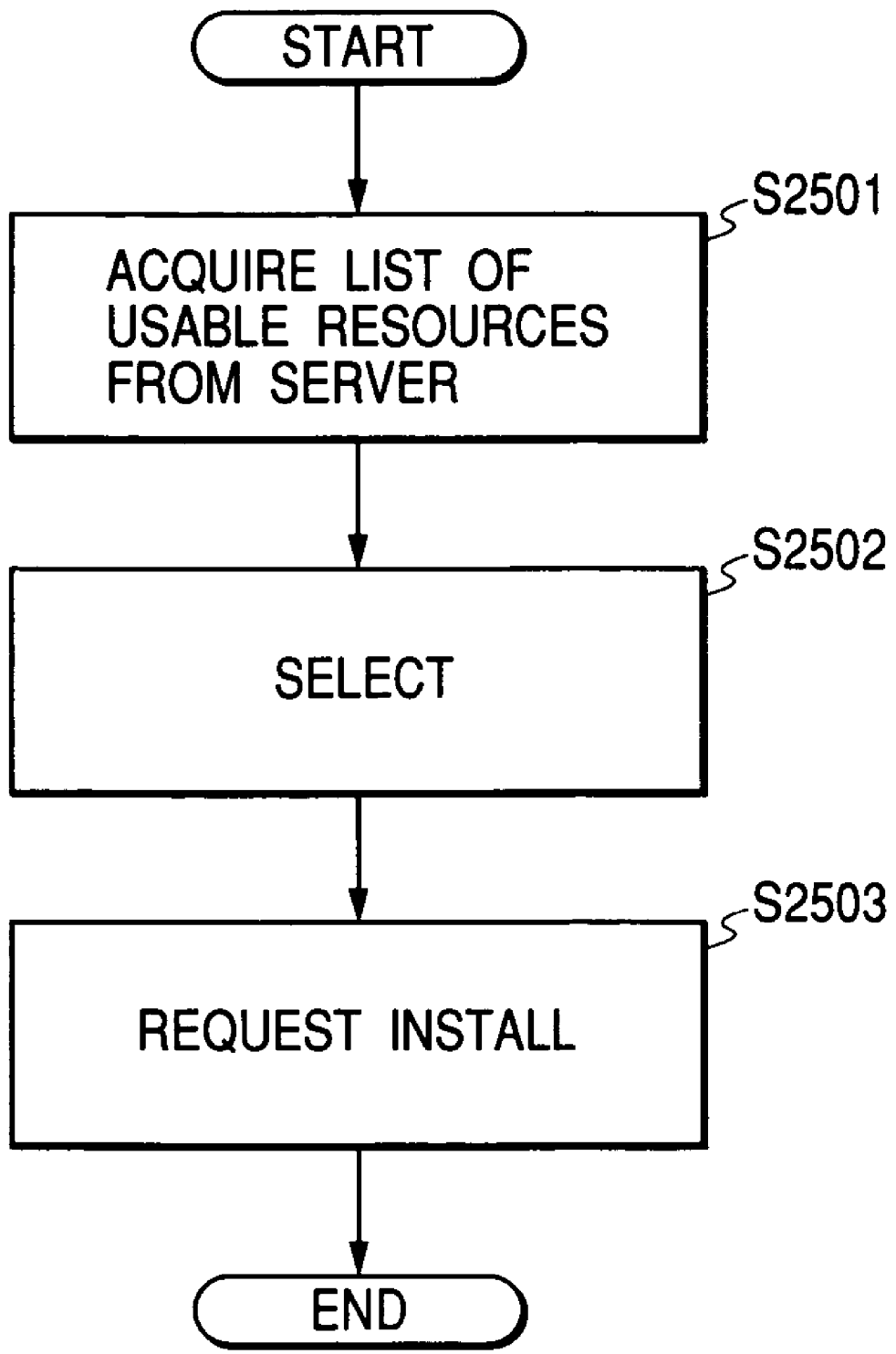
FIG. 25 is a flowchart showing pull install processing in a client apparatus.
Figure 26:
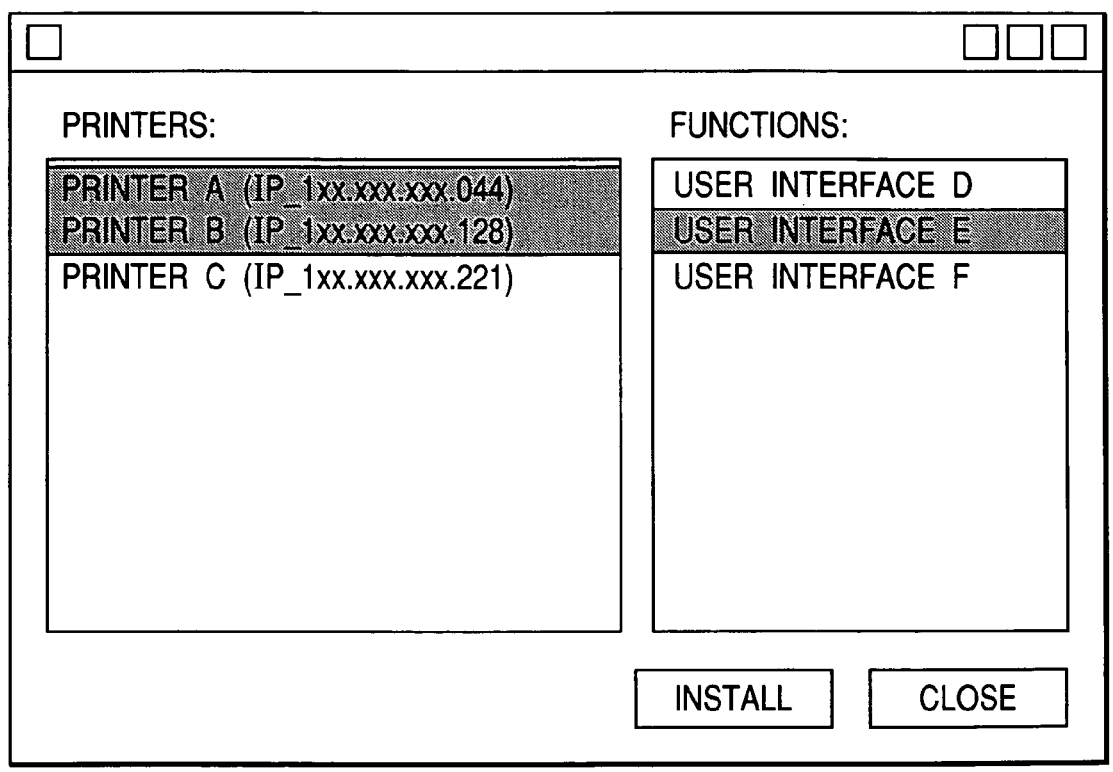
FIG. 26 is a diagram showing an example of a UI for causing a client user to execute pull install processing.

FIG. 25 is a flowchart showing pull install processing in a client apparatus in the third embodiment. FIG. 26 is a diagram showing an example of a UI for causing a client user to execute pull install processing. A program for the pull install processing is stored in an area 311 in FIG. 3 and is executed by the CPU on the client side in FIG. 2.

In the flowchart of FIG. 25, first, in step S2501, the client apparatus accesses a server to acquire list information of printers and extended modules which are managed by the server, and displays the acquired information on the UI.

Next, in step S2502, a client user selects a printer and extended modules, which the client user desires to use, out of the printers and the extended modules displayed on the UI shown in FIG. 26.

Next, in step S2503, the client user issues an install request message to the server by depressing an install button, and the client apparatus sends a list of selected printer and extended modules, which the client user desires to install, to the server. The subsequent install processing is performed on the server side which has received the install request message.

Processing of the server in response to the install request from the client apparatus is basically the same as the processing shown in the flowchart in FIG. 18 which is described in the first embodiment. However, in this embodiment, as the processing in step S1804 in FIG. 18, a difference found by comparing the install state management table and the list of requests sent from the client apparatus is installed. In addition, environment setting such as an output port is also performed in the same manner as the first embodiment described above.

Note that it is also possible to adopt, as a trigger for starting the pull install, an intuitive operation according to drag and drop from a list of printers and extended modules rather than the depression of the install button displayed on the UI.

The pull install in the case in which the client apparatus has selected a printer is completed as described above.

Note that, in both the above-described embodiments, only a difference module is installed with reference to the install state management table. However, it is also possible to install all designated driver sets or plug in all designated extended modules alone at the time of install request.

As described above, according to the present invention, the client user simply issues a request for driver install or selects a printer, which the client user desires to use, out of the printers managed by the server and then issues a request for driver install, whereby installation and environment setting in the client apparatus of the client user are performed. Therefore, it is possible for the user to install a usable printer driver easily in the client apparatus of the user without requiring special knowledge.

For example, in the case in which a company desires to limit thoughtless operation of general users, setting of specific functions can also be prevented from being changed simply by plugging in a UI module, in which control on a UI is masked, without changing a print function.

Usability can also be improved without affecting an existing system simply by plugging in a UI module corresponding to needs, such as a UI customized for convenience in businesses, a UI localized for people in other countries, a simplified UI or an advanced UI corresponding to the level of a user, and a UI including a shell changed in accordance with preference of a user.

There is also an effect that it is made possible for an IT manager to manage introduction of a UI with limited use of functions or a customized UI for each user.

There is also an effect that a user can select and use a preferable UI by himself/herself.

There is also an effect that, since service engineers and a development section can change a UI by developing only a UI module, it becomes possible to provide a UI corresponding to user needs with less man hours of work.

An IT manager can grasp states of respective client apparatuses by recording modules and versions, which were installed in the respective client apparatuses in the past, in a print server.

There is also an effect that, since installation work can be performed by the necessary minimum update of a file by distinguishing a difference module and a difference of a version, the time necessary for the installation work can be reduced and the factors that contribute to making the system unstable can be reduced.

In addition, there is also an effect that not only new install of a printer driver but also addition and change of a driver function can be easily processed without reboot.

Further, there is also an effect that, since an update can be performed according to an intension of a user, an automatic delivery function, which is provided by an OS and proceeds without an operation by a user, can be avoided.

Moreover, there is also an effect that a customized printer driver set can be created easily.

An embodiment which is preferable in applying the present invention will be hereinafter described. A network system which performs installation of a pull type printer driver will be described first, and a push type printer driver will be described next. In addition, although installation of a printer driver will be described as an example in the embodiments, this embodiment can also be applied to general driver programs for peripheral devices. Moreover, this embodiment can also be applied to an application program.

Figure 27:
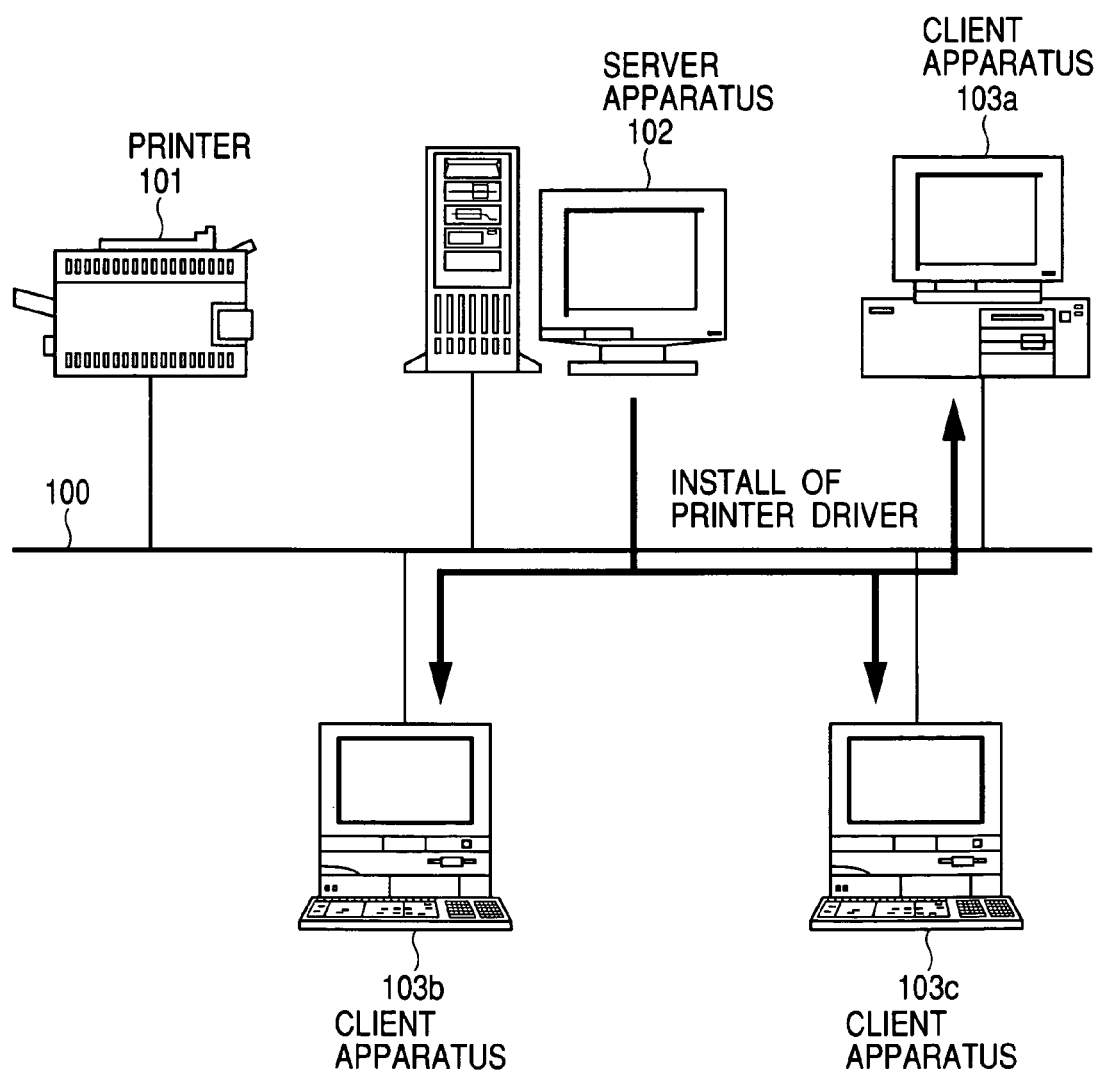
FIG. 27 is an example of a structure of a print processing system showing an embodiment of the present invention.

FIG. 27 is an example of a structure of a print processing system showing an embodiment of the present invention. The system in FIG. 27 is generally the same as that FIG. 1. A block diagram showing an internal structure thereof is the same as FIG. 2. A server apparatus 102, plural client apparatuses 103, and a printer 101 are connected on a network 100. A printer driver can be installed in the client apparatuses from the server apparatus 102 as described later. In addition, although not shown in the figure, a scanner, a digital camera, a facsimile, a mouse, a speaker, a sound source device, a telephone, a copying machine, and the like are connected on the network.

Figure 28:
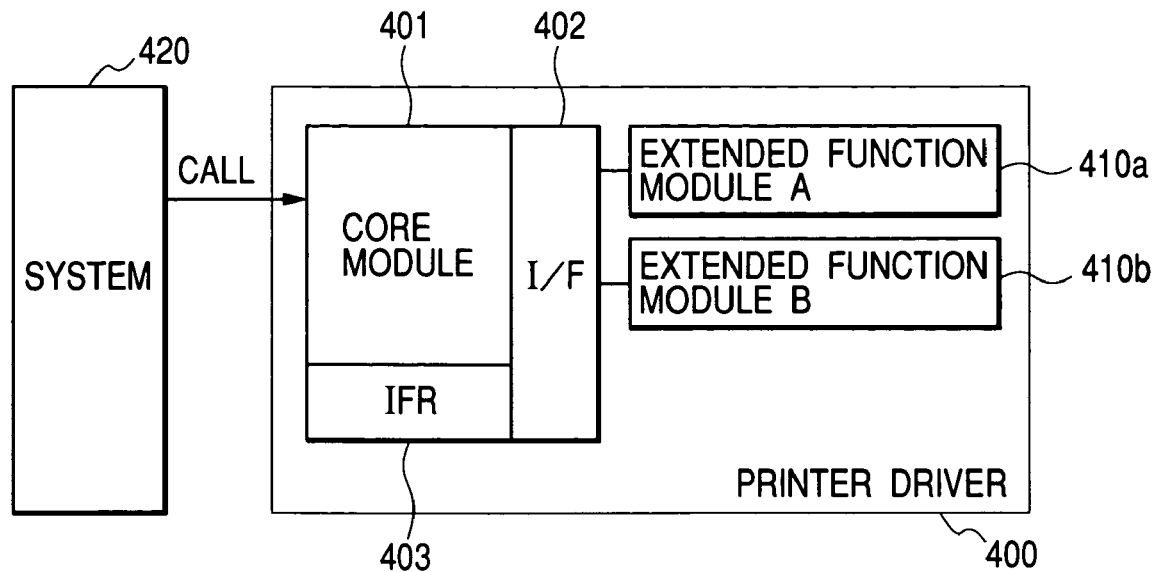
FIG. 28 is a diagram showing a structure of a printer driver and a relation between the printer driver and a system in the embodiment.

FIG. 28 is a diagram schematically showing a structure of the printer driver 400 and a call of a printer driver from the operating system (hereinafter simply referred to as system) 420. The printer driver 400 is basically constituted by the core module 401 and the extended function module 410x (x=a, b, . . . ). However, if there is no function which can be extended, there is no extended function module, and the number of the extended function modules is zero.

The core module 401 is a module which is directly called from the system 420 or an unillustrated application and performs basic print setting processing and print execution processing.

The extended function module 410x is a replaceable extended function module which performs specific processing and is called from the core module 401 through the interface I/F 402 as required. Note that the extended function module 410x can be plugged in (added or replaced) using a tool (installer), whereby a function of a printer driver can be added and updated.

As a method of calling at the time when the core module 401 calls the extended module 410x, for example, an "interface fixed system", an "interface registration system", "use of the COM", and the like are possible.

The interface fixed system is a system in which file names, function names, arguments, and the like in calling respective functions are defined. When the respective functions are required, the core module 401 calls the extended function module 410x in accordance with the respective definitions and, if there is an extended function module which meets the requirement, uses processing of the extended function module. The extended module 410x is created in accordance with the respective definitions.

In this first system, for example, in the case in which an extended function module corresponding to a function name secured in advance is not installed for the function name, since the core module 401 fails in the call, it is determined that a corresponding extended function module is not installed. In the case in which the extended function module is installed, since the core module 401 succeeds in the call, processing held by the extended function module is executed. When the extended function module is uninstalled, an entry is erased by deleting the module. Consequently, installation and deinstallation of an extended function module can be performed. Note that installation of an extended function module is specifically called a plug-in operation.

The interface registration system is a system in which file names and function names in calling respective functions are registered in the I/F 402. When the respective functions are required, the core module 401 calls the extended module 410x using an interface registered in the I/F 402. The extended module 410x can be provided using an arbitrary file name or function name and can be mixed with other extended modules. In addition, when the extended module 410x is plugged in an existing printer driver set, the installer performs registration or an update of an interface in the I/F 402 through the interface registration function IFR 403.

According to this second system, for example, a correspondence table showing function names and entry points of extended function modules corresponding to the function names is stored in the I/F 402. Then, in accordance with installation of an extended function module, a function name and an entry point associated with the extended function module are registered in the I/F 402. At the time of deinstallation, an item of the table corresponding to an extended function module to be uninstalled is deleted. Such a maintenance function of the table is provided by the IFR 403. The extended function module is executed by calling of a function name registered in the table. Therefore, only the extended function modules registered in the table are installed extended function modules.

The system using the COM is a system in which formats in calling respective functions are defined in advance, and an extended function module is registered in the system 420 as a COM component. The COM (Component Object Model) is an inter-object communication protocol established by Microsoft Corporation in the United States. An object complying with the protocol is called a COM component. In the method using the COM, it becomes also possible to include an entity of an extended module in a print server due to transparency of location which is a characteristic of the COM.

In this third system, in the case in which an extended function module is installed, the module is registered in the system 420 and, when it is uninstalled, the registration is deleted.

With the above-described systems, it is possible to call the extended function module 410x. In addition, with systems corresponding to the calling methods, both installation (plug-in) and deinstallation of an extended function module becomes possible. However, the calling methods and the installation (addition) and uninstalling methods described here are only examples, and the present invention is not limited to these methods. Note that replacement of an extended function is realized by a combination of deinstallation and installation.

Note that the I/F 402 may function as a part of the core module 401 or may be an independent module. Similarly, in the second system, the IFR 403 may be integral with the core module 401 or may be independent from the core module 401.

In addition, in the case in which the core module 401 has failed to call the extended module 410x, that is, in the case in which a pertinent extended module does not exist, common processing is performed in the core module 401, or processing is continued skipping pertinent function processing.

Further, functions of the core module 401 and the extended module 410x can be divided in various ways according to various designs. For example, it is also possible to perform the common processing to be a base in the core module 401 and make only specific individual functions (e.g., communication with devices, color processing, rendering, etc.) dependent as extended modules. Here, the common processing includes processing for carrying out a function of a printer normally provided by the operating system. For example, there is processing for converting print data into a command system which can be processed in a printer. In addition, the specific individual functions provided as extended function modules include communication with a device (printer), color processing, a user interface (UI), and rendering processing.

Alternatively, it is also possible to use a core module as a wrapper which processes only call from the system 420 and places a part managing all substantial functions provided by a printer driver, that is, a flow of the entire processing in an extended module.

Note that the above-described mechanism is not limited to a printer driver but can also be applied to a print system including other utilities. Moreover, it is needless to mention that the mechanism is applicable to systems other than the print system.

Figure 29:
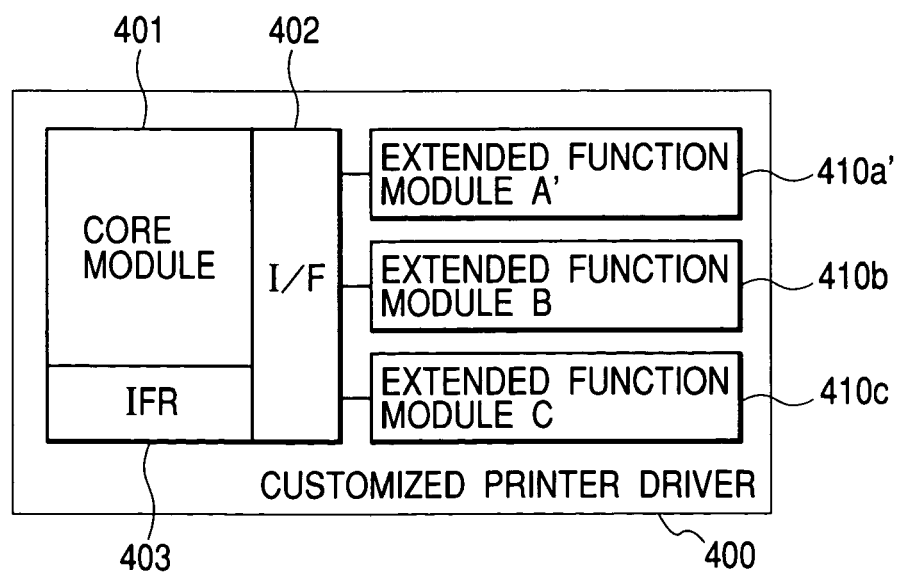
FIG. 29 is a diagram showing an example of provision of a customized printer driver set in the embodiment.

FIG. 29 is a diagram showing an example of a structure of a printer driver, a function of which is extended by an extended function module, such as a printer driver set customized for specific users. Compared with FIG. 28, the extended function module A is replaced with an extended function module A', and an extended function module C is added. Here, the replacement with the extended function module A' means that, while using an I/F identical with an existing extended function module, contents of processing of the I/F can be changed. In addition, the addition of the extended function module C means that specific processing can be added or specific processing can be hooked. By changing a combination of extended function modules in this way, a customized printer driver set, in which a special function is added or a specific function is masked, can be easily provided.

Figure 30:
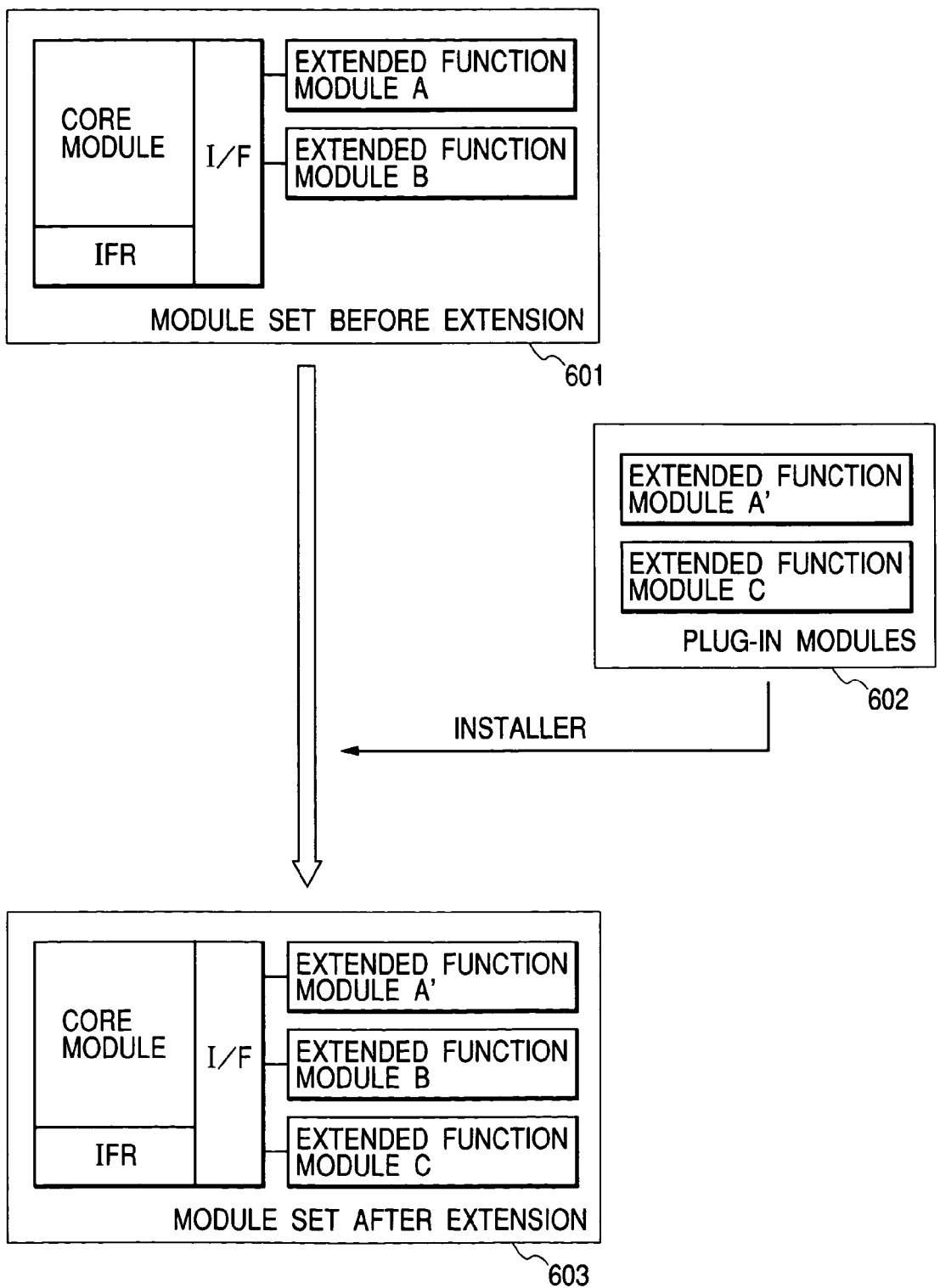
FIG. 30 is a diagram showing a change of a driver structure according to plug-in install in the embodiment.

FIG. 30 shows a state in which an extended function module is plugged in. The figure shows processing for plugging an extended function module 602 (an extended function module is also called a plug-in module), which consists of the extended function module A' and the extended function module C, in the existing printer driver set 601 using an installer. Here, the extended function module A' has the same interface as the existing extended function module A and is replaced with the extended function module A according to plug-in. In addition, the extended function module C is added because there is no existing module corresponding to the extended function module C. As a result of the plug-in, the printer driver set has a structure like the printer driver 603. Replacement and addition of an extended function module is performed in accordance with any one of the above-described three systems.

<Creation of a Management Table>

Figure 31:
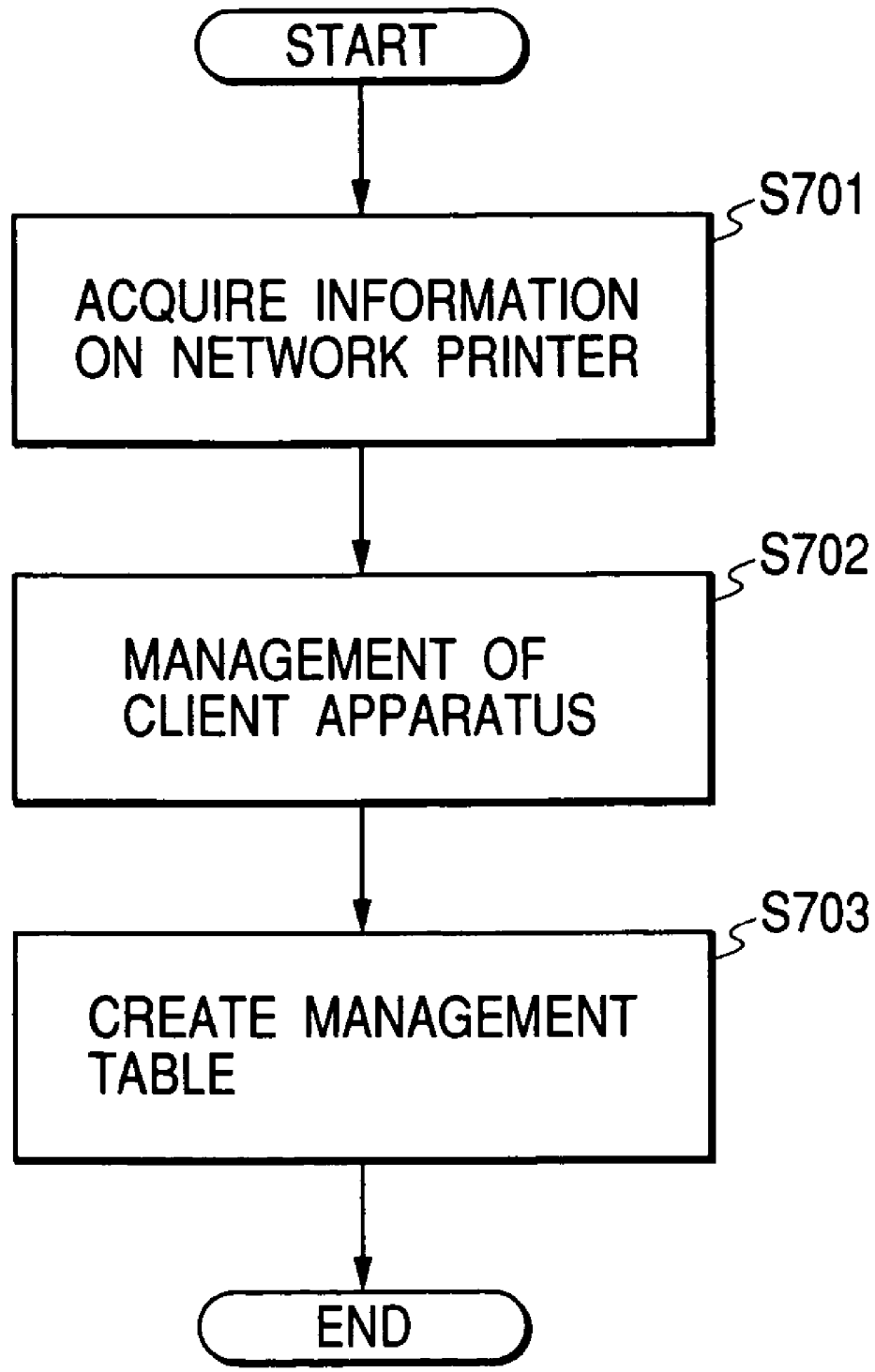
FIG. 31 is a flow diagram showing maintenance processing for a management table in the embodiment.

FIG. 31 illustrates processing in the server 102 in this embodiment in a form of a flowchart. Here, processing of printer management in accordance with an operation of an IT manager will be described. The processing of FIG. 31 is started with an operation by an operator such as the IT manager as a trigger. A management table 801 shown in FIG. 32 is created according to a procedure of FIG. 31. The program stored in the area 301 of the server apparatus in FIG. 3 is read out and executed by the CPU of the server apparatus in FIG. 27.

First, in step S701 in FIG. 31, the server searches for information on a printer connected to a network and acquires the information. At this point, the server also collects and manages an environment, such as an output port and a necessary printer driver. The information on a printer is usually inputted when the printer is connected to the network. This information on a printer includes an output port (an IP address, etc. in the case of an IP network), an identifier of the printer, and the like. The collection of the printer driver is performed by, for example, selecting a file, which matches the printer connected to the network, such as a file, which has an identifier coinciding with an identifier of the printer, out of files or the like of driver programs stored in the server and specifying a location or the like of the file. For example, if the printer is installed in the server, the coincidence of the identifiers can be determined on the basis of a correspondence relation between the printer and the printer driver associated by the installation. In addition, it is also possible to cause the IT manager to designate an association between the printer and the printer driver to collect the designated printer driver as a necessary one.

Moreover, when the printer driver is specified, an extended function module, which can be added to the printer driver, is also specified. This can also be realized by giving the identifier or the like of the printer as a part of a program file of the extended function module. What can be collected are a driver program (core module) prepared in the server and information on the extended function module (a name and a location, a corresponding driver identifier, a corresponding printer identifier, etc.).

Next, in step S702, the server creates a management list of client apparatuses connected to the network. Here, the IT manager may register clients to be objects of management manually, or the server may collect information on all client apparatuses existing under its control, for example, information such as identifiers and addresses. Note that, if it is unnecessary to perform management of individual clients, a management list is not specifically required. In that case, step S703 is not performed.

Figure 39:
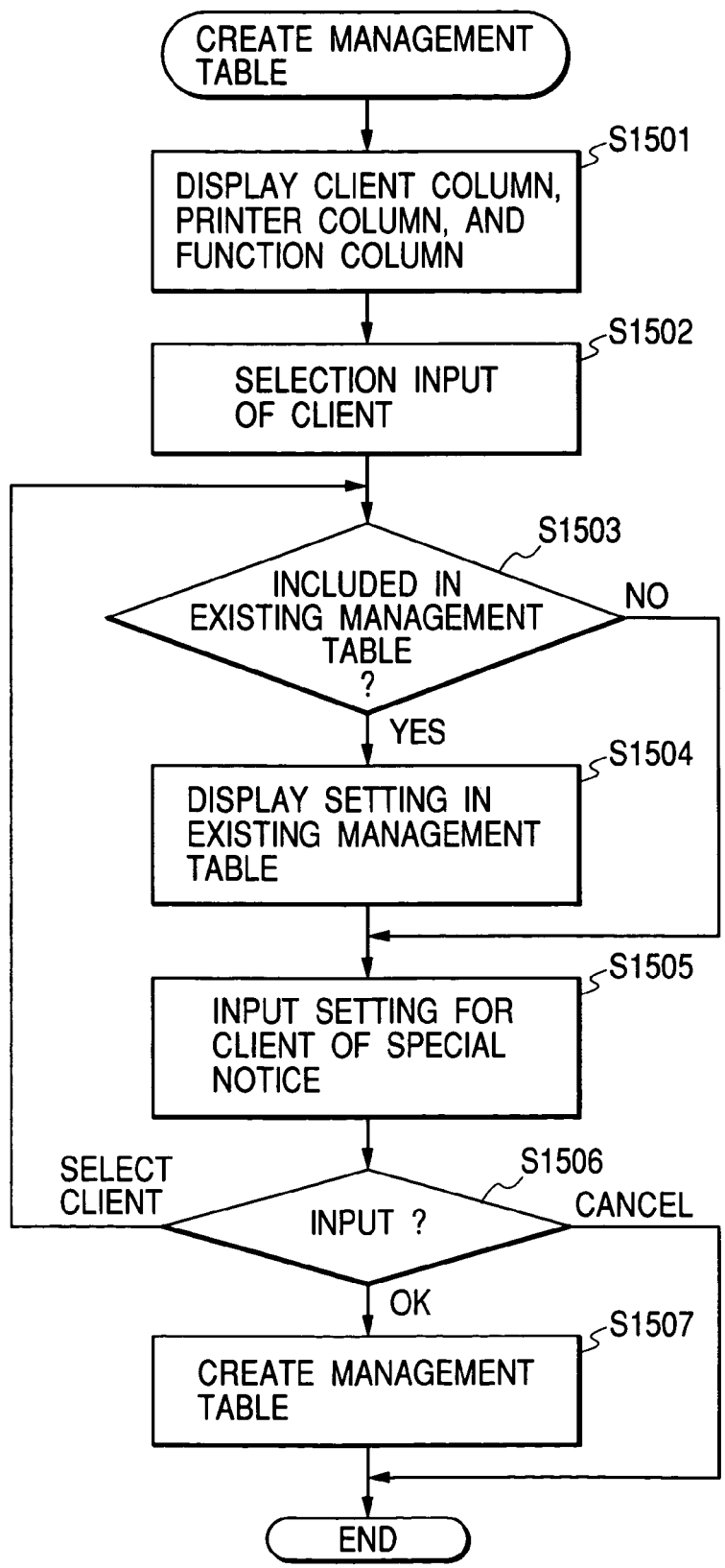
FIG. 39 is a flow diagram of details of a procedure for creating a management table in a server of the embodiment.

Next, in step S703 in FIG. 31, the server creates the management table 801 as illustrated in FIG. 32. Here, on the basis of the printer information collected in step S701 and the management list created in step S702, printers and extended functions, which the respective clients are allowed to use, included in the management list is registered in the management table 801. Details of the creation of a management table are shown in FIG. 39.

Figure 33:
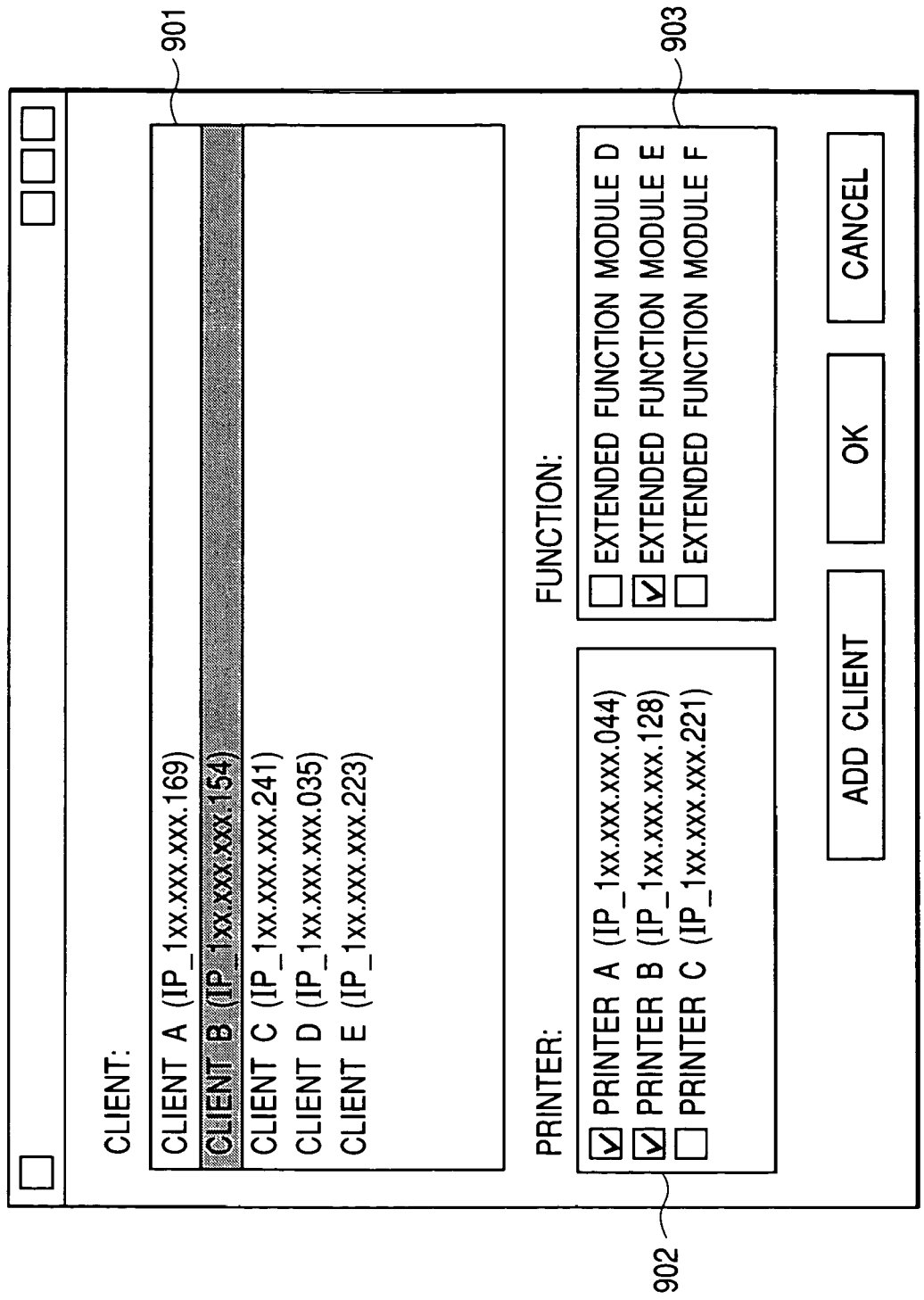
FIG. 33 is a diagram showing an example of a UI screen which an IT manager uses for performing management of a printer and clients in the embodiment.

The IT manager performs the creation of a management table on a user interface (UI) as illustrated in FIG. 33. For this purpose, first, the server 102 displays identifiers and addresses of the clients in a client column 901 in FIG. 33, displays identifiers and output port numbers (addresses) of the printers in a printer column 902, and displays extended function modules in a function column 903 on the basis of the management list (step S1501 in FIG. 39). If types of the printers are different from each other, extended functions of the printers may also be different from each other. Thus, in the case in which plural kinds of printers are connected to the network, all the extended function modules may be displayed in the function column 903 simultaneously, or only an extended function module corresponding to a printer selected from the printer column 902 may be displayed on the function column 903. In the former case, in order to clarify a correspondence relation between the printers and the selectable extended function modules, it is desirable to increase identifiability by, for example, displaying each printer in an independent column.

After displaying the respective columns in this way, the server causes the IT manager to set the management table. The setting is performed for each client. Thus, first, the server causes the IT manager to select a client (step S1502). In the example of FIG. 33, the client B is selected.

When the client is selected, if there is an existing management table (step S1503-YES), the server reads contents of the management table (i.e., setting of the present respective clients) and displays setting for the selected client (step S1504). In other words, printers and extended functions, which the client selected from the client column 901 by the IT manager is allowed to use, are displayed with check marks in the lists of the printer column 902 and the function column 903, respectively. In the example of FIG. 33, the printers A and B and the extended function module E, which the selected client B is allowed to use, are displayed with check marks, respectively.

The operator can see states of the respective clients by changing a selected client in the client column. At the time of first setting, since no allocation is made in all the columns, it is set from the start which printer and function are allowed to be installed in which client. Note that, addition of a client to be an object of management may be performed on this UI.

When the present setting is displayed in this way, the IT manager attaches check marks to printers and extended function modules, which the client of special notice (i.e., selected client) is allowed to use, and sets the printers and the extended function modules as usable (step S1505).

In this case, if an input is selection of a client, the procedure of step S1503 and subsequent steps is repeated fro the selected client. In addition, if an "OK" button is pressed, the server saves setting, which has been inputted at that point, as the management table 801. In other words, the server constitutes the management table 801 of FIG. 32 associating the printers and the extended function modules, which are checked for the respective clients, and saves the management table 801 (step S1507). When a "Cancel" button is pressed, the server ends the processing without changing the management table.

Note that a printer not included in the printer information collected in step S701 in FIG. 31 and a client apparatus not included in the management list created in step S702 are included in the existing management table, the printer and the client apparatus may be deleted as ones disconnected from the network. Alternatively, the server may leave treatment of the printer and the client apparatus to the IT manager giving priority to contents of the existing management table.

<Pull Install of a Driver or an Extended Function Module>

Figure 34:
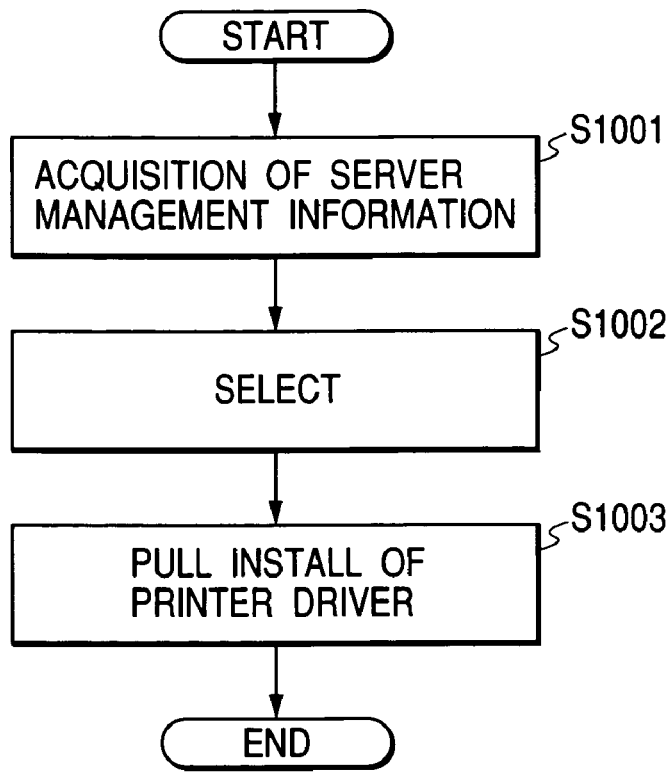
FIG. 34 is a flow diagram showing pull install processing in a client in the embodiment.

FIG. 34 is a flowchart showing processing in a client and a server in this embodiment. Here, processing at the time when a client user performs pull installation will be described. The pull install is processing for causing a client to request a program to be an object of installation, which is stored in an apparatus such as a server, and store the program in the client itself. In other words, the pull install includes a series of processing of download request, download, and installation of a program.

In FIG. 34, first, in step S1001, the client 103 sends an inquiry for information on usable apparatuses about printers and extended functions, which the client 103 can use, to the server 102 together with an identifier of the client 103, and acquires the information on usable apparatuses, that is, a list of the usable printers and extended function modules. At this point, the server 102 selects information on the pertinent client from the management table managed by the server 102 and returns the information to the client 103.

In the case in which the information is acquired in step S1001, next, in step S1002, the client 103 displays the acquired information on a display screen of the client 103. Then, the client 103 causes the client user to select a usable printer or extended function module.

Figure 35:
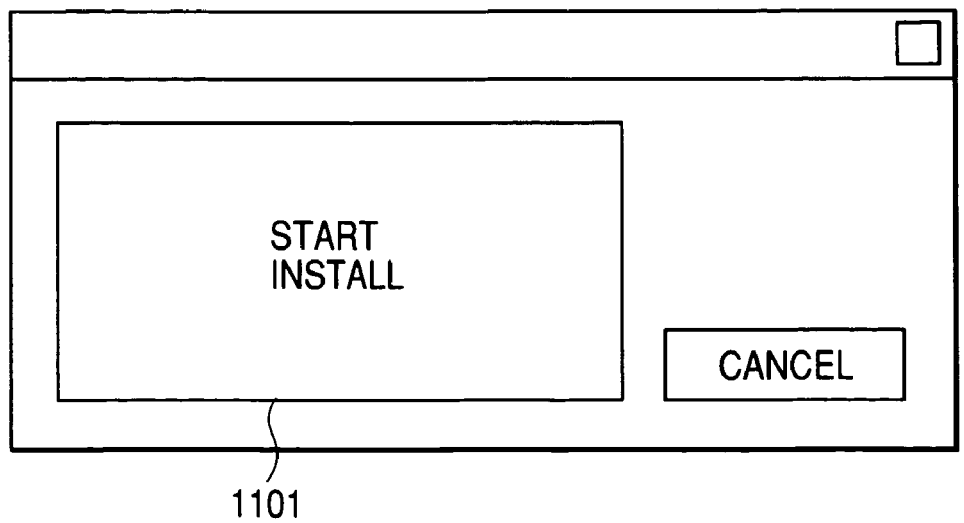
FIG. 35 is a diagram showing an example of a UI screen which a client user uses for executing pull install processing in the embodiment.
Figure 38:
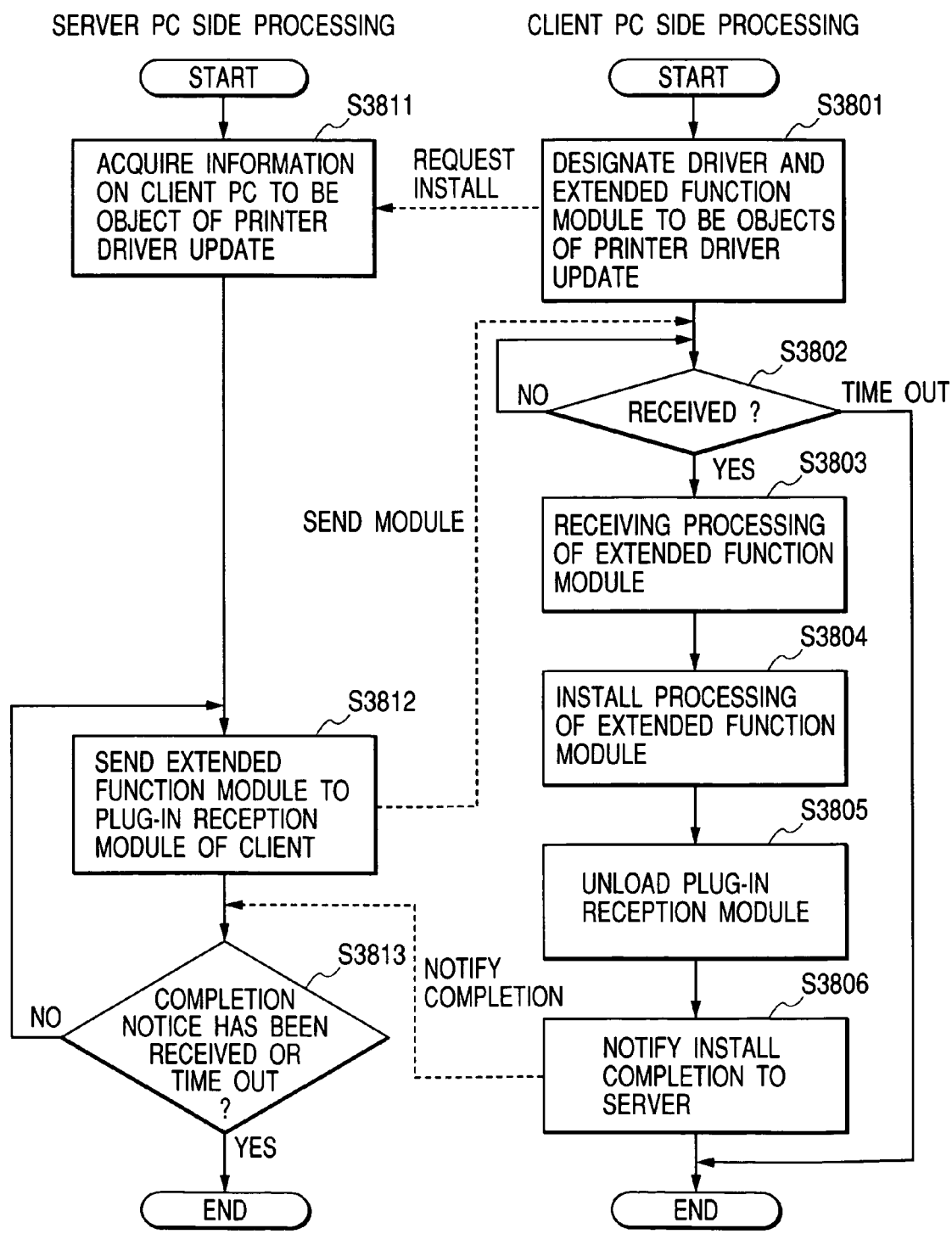
FIG. 38 is a flow diagram of a pull install processing procedure in a server and a client in an embodiment of the present invention.

Next, in step S1003, the client 103 executes the pull install of the selected driver or extended function module. FIG. 35 shows an example of a UI for executing the pull install. The pull install in step S1003 is started as depression of an install start button 1101 as a trigger. Details of step S1003 is shown in FIG. 38. Note that install of an "extended function module" is described in FIG. 38 and the explanation of the figure. This is completely the same for a core module of a driver.

In FIG. 38, first, the client 103 issues an install request to the server 102 (step S3801). In that case, the client 103 sends information designating the printer and the extended function module selected in step S1002. In addition, at the same time, the client 103 loads a plug-in reception module, which receives a module to be installed anew in the client 103 and installs the module, in a memory.

The server 102, which has received the installation request, acquires the designated information concerning the pertinent client from the management table managed by the server 102 (step S3811), and sends the registered printer drivers and extended function modules to the plug-in reception module of the client 103 of the request source (step S3812). The server 102 determines whether or not an install completion notice has been received from the client 103 or a fixed time has elapsed (step S3813) and, if the install completion notice has been received or the fixed time has elapsed, ends the processing.

On the other hand, the client 103 receives the module, which should be installed, from the server 102 and, when a fixed time has elapsed after the install request, stops the install processing (S3802-time out). If the module has been received normally, the client 103 receives the entire module (step S3804) and executes the plug-in reception module to install the module. If the module to be installed is an extended function module, the module is installed according to a predetermined method among the three methods and is combined with the core module. In addition, if the module to be installed is a core module, the module is installed in the same manner as a usual device driver. Further, the client 103 performs environment setting such as an output port together with the install.

When the installation has ended, the client 103 unloads the plug-in reception module (step S3805) and. informs the server 102 that the installation has been completed (step S3806).

The pull install in the client is completed as described above.

As described above, in performing the pull install of a device driver, the driver is divided by a unit of function and prepared as installable function modules, whereby the client can install only necessary functions.

In addition, the server can designate drivers and functions which each client is allowed to use. The client can select a function to be installed within the allowed range.

Therefore, even if installation is left to an operator of a client apparatus, management of the client can be performed.

In addition, since the client user can install a program simply by instructing installation without any special knowledge, special education is not required, and it becomes unnecessary to go all the way to client apparatuses to install a printer driver.

Further, there is also an effect that the IT manager can perform management such as limiting user of printers and functions or customizing the printers and the functions for each client by maintaining the management table in the server, and it becomes possible to centralize and simplify the management.

Moreover, in this embodiment, since it is possible to update an extended function module even if a core module is loaded, it becomes possible to perform update work for a printer driver without being affected by a system (OS) and an application and without rebooting.

In this way, update of functions of the printer driver can be performed easily by plugging in only an extended function module.

In the management of printers and extended functions in the server, the functions may be dependent upon printers.

Figure 36:
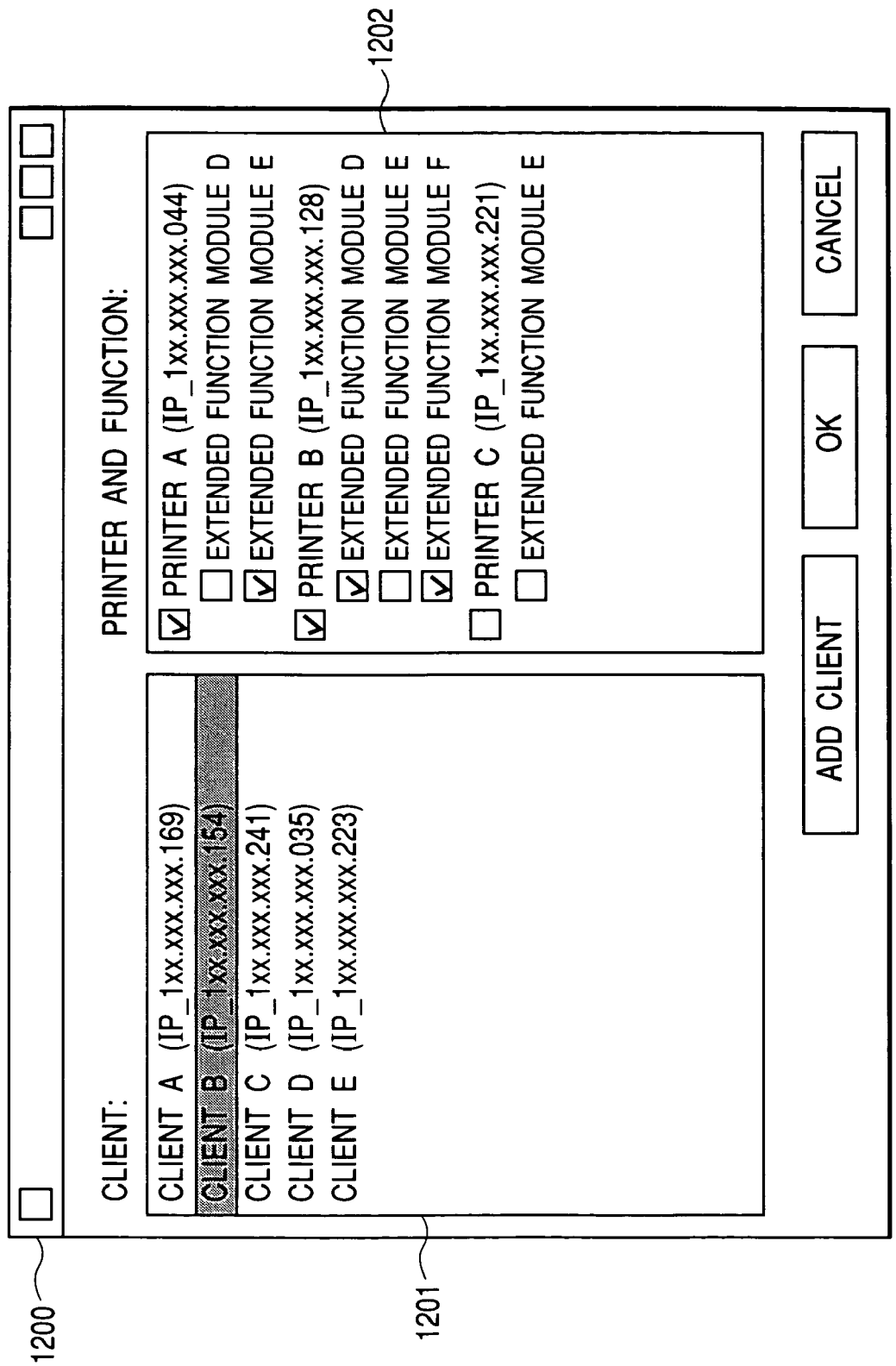
FIG. 36 is a diagram showing an example of a UI screen which an IT manager uses for performing management of a printer and clients in the embodiment.

FIG. 36 shows an example of a UI in which extended functions are dependent upon printers compared with FIG. 33. In other words, when a client is selected from a client column 1201, information incidental to the client is displayed as in FIG. 33, but it becomes possible to select a printer to be used and also select dependent extended functions for each printer from a printer and function column 1202. In this embodiment, since setting of dependent extended functions has no meaning in the case in which a printer is set to be usable, in FIG. 36, the printer C is not set to be usable for the client B. Therefore, it is also possible to display the extended functions with gray display such that the extended functions cannot be selected.

The IT manager creates a management table through this UI 1200 and, when a pull install request is received from a client user, performs installation of a printer driver and an extended function module corresponding to the management table. Note that, the management table is created in a format in which usable printers are associated with each client, and usable functions are associated for each of the printers.

In this modification, a processing flow in the case in which usable printers and extended functions are simply managed without applying limitation to each client on the server, and a client user selects and use a necessary printer and extended functions will be described.

Figure 37:
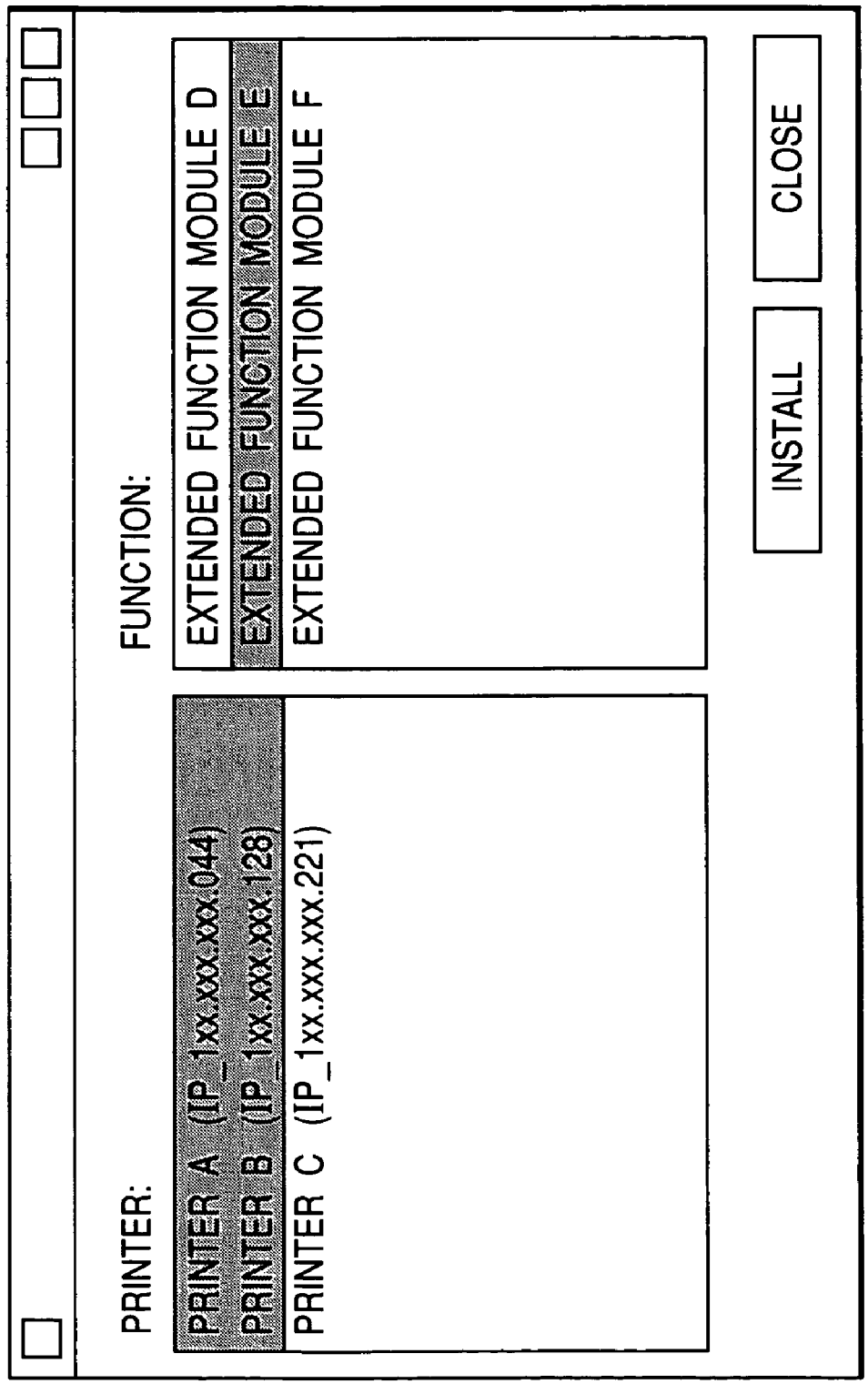
FIG. 37 is a diagram showing an example of a UI screen which a client user uses for executing pull install processing in the embodiment.

FIG. 37 is a diagram showing a UI which a client user uses for selecting necessary printers and extended functions and executing pull install. A flow of processing in the client in this embodiment will be described using a flowchart of FIG. 34.

First, in step S1001, the client 103 acquires information on a list of printers and extended functions managed by the server 102. The list to be acquired is a list of printers and extended function modules which are not limited by a management table.

Next, in step S1002, the client 103 displays the acquired information on a UI as shown in FIG. 37. As in the example of the UI, the printers and the extended functions are set to be selectable, respectively.

Next, in step S1003, pull install is started according to depression of an install button. At this point, the client 103 requests the server 102 to install a list of printers and extended functions, which the client user desires to install, and the server 102 installs pertinent printer drivers and extended function modules in the client 103 of the request source. In addition, environment setting such as an output port is also performed as in the above-described embodiments.

Note that it is also possible to adopt, as a trigger for starting the pull install, an intuitive operation according to drag and drop from a list of printers and extended modules rather than the depression of the install button.

Setting of drivers and function modules to be objects, for which use is allowed, in this embodiment is performed for each client. However, in the case in which common setting is made for all the clients, the display of the client column 901 in FIG. 33 becomes unnecessary, the common setting is made for all the clients, and a common management table is also created for all the clients.

In FIG. 34, modules to be objects of install are limited in steps S1001 and S1002. However, if installable modules are designated by the client 103, these steps become unnecessary.

In this embodiment, devices, in which drivers are installed, are network devices to be connected to a network. However, local devices connected to a client may be objects. This is true for this embodiment.

As another embodiment, a system for so-called push install processing which starts, in the server 102, install processing for installing a driver or the like in the client 103 will be described. In this embodiment, a structure of a network system, a structure of the management table 801 and a procedure for creating the management table 801, and the like are identical with those in the above-described embodiments.

<Push Install of a Driver or an Extended Function Module>

Figure 40:
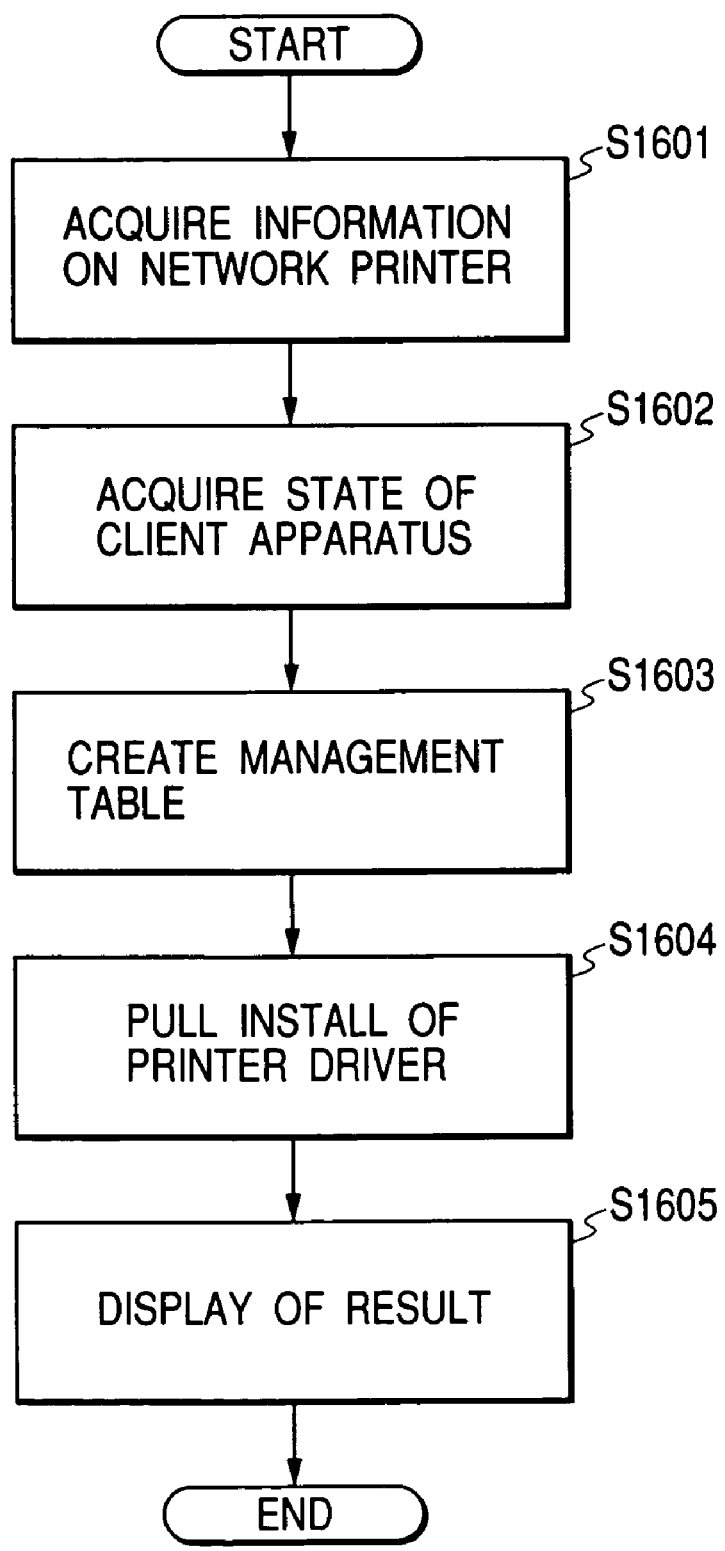
FIG. 40 is a flow diagram showing push install processing in a server in this embodiment.

FIG. 40 is a flowchart of processing in a server in this embodiment. Since operations are performed only on a server apparatus side, operations by an IT manager in the server apparatus and processing of the server will be described here. A program for the processing is stored in a memory on the server side in FIG. 27 and is executed by the CPU on the server side.

First, in step S1601, the server searches information on printers connected to a network and acquires the information. At this point, the server also collects and manages environment information such as an output port and information on necessary printer drivers.

Next, in step S1602, the server searches information on client apparatuses connected to the network and acquires the information. Here, information on all client apparatuses existing under the control of the server may be collected, or acquisition of information may be applied to client apparatuses which are registered as objects of management in advance. Objects of information to be acquired include information on whether or not the respective clients are under the control of the server at present (whether or not the respective clients are connected to the network), types of printers used in the respective clients, versions of drivers, and extended functions.

Next, in step S1603, the server creates a management table as illustrated in FIG. 32. Here, the server manages used printers and extended function for each client. Moreover, the server displays the UI as illustrated in FIG. 33 to cause the IT manager to set printers and functions to be installed in the respective clients. Here, first, contents of the management table of FIG. 32, that is, states of the present respective clients. When an arbitrary client is selected in the client column 901, printers and extended functions, which are usable in the client, are displayed in the lists of the printer column 902 and the function column 903 with check marks, respectively. This is the same as the above-described embodiments. The IT manager can see states of the respective clients by changing a client selected in the client column 901. Note that a state of a client which is not connected to the network at present may be seen. For example, it is possible to display the client in gray like the client D. In addition, it is also possible to show the client by adding a mark indicating prohibition.

Here, a constitution of final clients is determined by changing the check, and the information is reflected on the management table 801. At the time of first setting, since no driver is in the table, it is set from the start which printer and function are to be installed in which client.

Next, in step S1604, the server performs the push install according to depression of the install button 1101 of FIG. 35 displayed on the server. The server collectively installs printer drivers (core modules and extended function modules) managed by the server in accordance with the management table 801 of FIG. 32 and also performs environment setting such as an output port. Note that, in the case in which one extended function module is actually constituted by plural program files, only a difference may be installed excluding the program files which have already been installed. This is the same in the above-described embodiments.

Next, in step S1605, the server displays a result of the installation. The server informs the client apparatuses that a driver has been updated, and informs the server that the update has ended or failed. In the case in which the client apparatus is not connected to the network or in the case in which the client apparatus is performing printing, the installation may fail. However, since the server receives the information on the failure, the information can be used as a material for a determination to take appropriate measures. For example, the IT manager performs processing later or the server apparatus makes a retry.

Note that, in the example of an operation screen, an example of treating clients individually is shown. However, it is needless to mention that it is also possible to update plural clients collectively.

Figure 41:
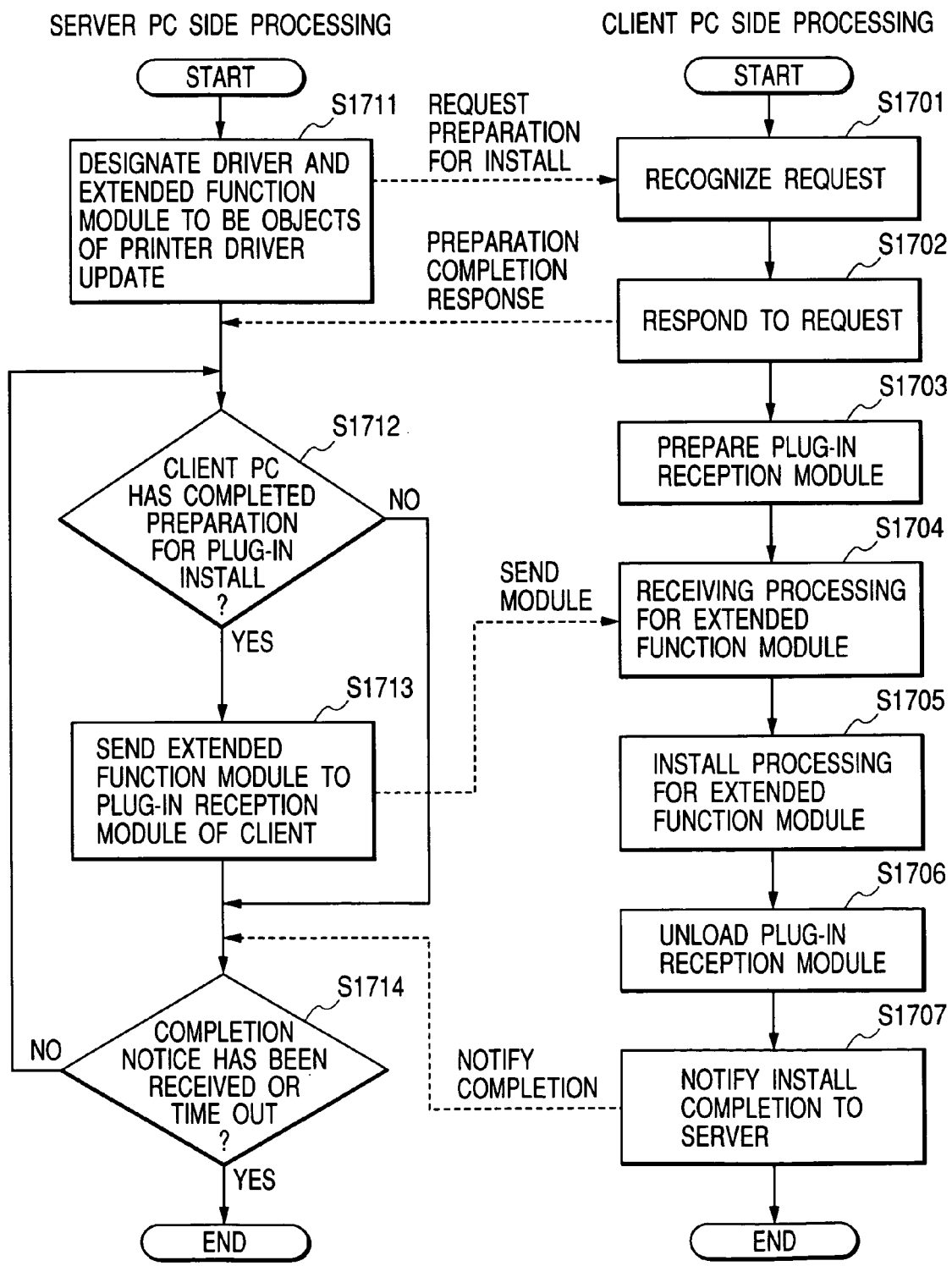
FIG. 41 is a flow diagram of a push install processing procedure in a server and a client in this embodiment.

FIG. 41 is a diagram showing details of step S1604 in FIG. 40.

Server PC side processing is realized by the CPU reading out a program for the processing from the memory on the server side and executing the program. Client PC side processing is realized by the CPU in the client reading out a program for the processing from the memory on the client side and executing the program.

First, when an instruction to install drivers or extended function modules to be installed is given in the server, the server designates the drivers or the extended function modules and issues an install preparation request to a client to be an object of install (step S1711).

The client receives and recognizes the request (step S1701), and then returns a response to the effect that the preparation has been completed (step S1702), and loads a plug-in reception module in the memory (step S1703). Steps S1702 and S1703 may be performed in an opposite order. Thereafter, the client waits for download of a core module and extended function modules from the server.

On the other hand, the server determines the presence or absence of a preparation completion response from the client (step S1712). If there is no response, the processing branches from step S1714 to step S1702, and the server waits for a response. When a fixed time has elapsed, time out occurs, and the processing is stopped.

If a preparation completion response is received from the client, the server sends the designated core module or extended function modules to the client (step S1703). Then, the server waits for an install completion notice from the client (step S1714). Note that, in FIG. 41, the transmission in step S1713 is repeatedly performed as long s a completion notice is not received. However, in the case in the transmission itself is successful, it is unnecessary to repeat the transmission.

The client waits for a module to be sent from the server and, when the module is received (step S1704), installs the module according to the plug-in reception module. This is as described in step S1604. The extended function modules are installed in accordance with a predetermined method among the three methods explained in the above-described embodiments (step S1705).

When the install ends, the client unloads the plug-in reception module (step S1706) and sends an install completion notice to the server (step S1707).

The push install is completed as described above. According to these system structure and processing procedure, it becomes possible to collectively install the printer driver in the client apparatuses only with an operation in the server. Therefore, an operation on the client side is unnecessary, and a program can be installed in the client easily and safely. As a result, education is not required, and it becomes unnecessary to go all the way to the client apparatuses to install a printer driver.

In addition, since the IT manager performs maintenance of a management table in the server, there is an effect that it becomes possible to perform management such as limiting use of printers and functions and customizing the printers and functions for each client, and it becomes possible to centralize and simplify management.

Further, there is an effect that it becomes possible to not only install a printer driver anew but also collectively process addition and change of a driver function easily without reboot, and consistency of versions among all the client apparatuses can be realized easily.

Moreover, there is also an effect that a customized printer driver set can be created easily.

Note that all the above-described modifications of the embodiment can also be applied to the following embodiment.

In addition, as an operation of the IT manager on the server, an intuitive operation according to drag and drop can be performed instead of creating a management table. For example, a list of network clients, a list of printers, and a list of extended function modules are displayed, and the IT manager selects a printer, which the IT manager desires to install, out of the list and drags and drops the printer to a client to be an object to thereby use it as a trigger for executing the push install. This is true for extended functions. This is applicable to the above-described embodiments.

Note that the present invention may be applied to a system constituted by plural apparatuses (e.g., a host computer, an interface apparatus, a reader, a printer, etc.) or may be applied to an apparatus consisting of one device (e.g., a copying machine, a facsimile apparatus, etc.).

In addition, the object of the present invention is also attained by supplying a storage medium (or a recording medium), which has recorded therein a program code of software realizing the functions of the above-described embodiments, to a system or an apparatus, and a computer (or a CPU or an MPU) of the system or the apparatus reading out and executing the program code stored in the storage medium.

In this case, the program code itself read out from the storage medium realizes the functions of the above-described embodiments, and the program code itself and the storage medium having stored therein the program code constitute the present invention.

Further, other than the case in which the functions of the above-described embodiments are realized by the computer executing the read-out program code, the present invention also includes a case in which an operating system (OS) or the like running on the computer performs actual processing partly or entirely on the basis of an instruction of the program code, and the functions of the above-described embodiments are realized by the processing.

Moreover, the present invention also includes a case in which, after the program code read out from the storage medium is written in a memory provided in a function extension card inserted in the computer or a function extension unit connected to the computer, a CPU or the like provided in the function extension card or the function extension unit performs actual processing partly or entirely on the basis of an instruction of the program code, and the functions of the above-described embodiments are realized by the processing.

OTHER EMBODIMENTS

In the network system in accordance with the present invention, a server apparatus includes: printer managing means which manages information on printers connected to a network; printer driver managing means which manages a printer driver for the printers to be object of management, the printer driver including a core module for performing basic processing and zero or more extended function modules which is called by the core module to perform processing of specific functions; client managing means which manages client apparatuses connected to the network; and dynamic installing means which installs the printer driver in the client apparatuses which has issued a request, wherein the client apparatuses include: means which issues an install request for installing the printer driver in the client apparatuses to the server apparatus; and means which installs the printer driver received from the server apparatus in storages of the client apparatuses.

Further, in the printer driver in accordance with the present invention, the extended function modules include means which performs plug-in (addition and replacement) and means which makes it possible for the core module to use functions of a new extended function module according to the plug-in, and the extended function modules make it possible to extend a driver function according to the plug-in.

Moreover, in the printer driver in accordance with the present invention, it is possible to create a printer driver provided with different functions and limitations, that is, a customized printer driver set by changing a structure of the extended function modules incorporated in a driver set.

As described above, according to the present invention, since functions of device drives to be installed in clients can be managed unitarily in a server or the like, the occurrence of malfunctions can be prevented according to efficiency of management and consistency of functions in an entire network, and inconveniences caused by client users installing programs individually such as the likelihood of a decrease in system security due to operations of the client users can be prevented.

In addition, the client users simply leaves installation to the server, simply issues a request for driver installation, or simply selects printers, which the client users desire to use, out of the printers managed by the server and then issues a request, whereby installation in the client apparatuses of the client users and environment setting are automatically performed. Therefore, there is an effect that neither special knowledge nor a difficult operation is necessary for the users.

Further, there is an effect that it becomes possible to unitarily perform management for each client such as limiting user of printers and functions and customizing the printers and functions for each client. In addition, there is an effect that it becomes possible to create a customized printer driver set easily.

Moreover, there is an effect that it becomes possible to easily process not only new installation of a printer driver but also addition and change of a driver function without reboot.

Furthermore, since it becomes possible to perform installation of printer drivers in the client apparatuses according to remote processing from the server by push-installing the printer drivers from the server, an operation on the client side is unnecessary, and it is possible to reduce the labor which have been required in the past such as education of the client users and going all the way to the client apparatuses.

What is claimed is:

1. A remote install method for a program in a network, said method comprising:

acquiring printer information on a plurality of printers provided in the network;

managing client information on a plurality of client apparatuses included in the network;

storing a client management table that manages, for each of the plurality of client apparatuses, (a) printer information on at least one of the plurality of printers to be used in the client apparatus and (b) at least one extended function program of a core printer driver for each of the at least one printer, based on the acquired printer information and the managed client information;

displaying a screen for updating the stored client management table, wherein a manager is allowed to select on the screen (a) one of the plurality of client apparatuses, (b) one of the at least one printer to be managed for the client apparatus, and (c) one of the at least one extended function program for the printer; and sending, to the client apparatus selected on the displayed screen, the extended function program for the printer in accordance with the updated client management table, wherein the extended function program includes a first extended module related to a new user interface corresponding to a function provided by the core printer driver, an extended function module for allowing the core printer driver to provide a new function, and a second extended module related to a user interface corresponding to the extended function module, and wherein an existing module is replaced by the first extended module, and the extended function module and the second extended module are added for function extension of the core printer driver in the selected client apparatus.

2. The remote install method according to claim 1, wherein the extended function program is (a) registered as an object to be supported by an inter-object communication function provided by an operating system of the client apparatus, (b) connected to a driver of a device connected to the client apparatus by the inter-object communication function, and (c) called in a form decided in advance.

3. The remote install method according to claim 1, wherein the sending is performed in accordance with designation of the client apparatus and an install starting instruction entered via an input unit.

4. The remote install method according to claim 1, wherein, in the displaying, the manager is allowed to select (a) at least two printers to be managed for the client apparatus and (b) respective different extended function programs for the at least two printers.

5. An apparatus comprising:
   acquisition means for acquiring printer information on a plurality of printers provided in the network;
   managing means for managing client information on a plurality of client apparatuses included in the network;
   storing means for storing a client management table that manages, for each of the plurality of client apparatuses, (a) printer information on at least one of the plurality of printers to be used in the client apparatus and (b) at least one extended function program of a core printer driver for each of the at least one printer, based on the acquired printer information and the managed client information;
   displaying means for displaying a screen for updating the stored client management table, wherein a manager is allowed to select on the screen (a) one of the plurality of client apparatuses, (b) one of the at least one printer to be managed for the client apparatus, and (c) one of the at least one extended function program for the printer; and
   sending means for sending to the client apparatus selected on the displayed screen, the extended function program for the printer in accordance with the updated client management table,
   wherein the extended function program includes a first extended module related to a new user interface corresponding to a function provided by the core printer driver, an extended function module for allowing the core printer driver to provide a new function, and a second extended module related to a user interface corresponding to the extended function module, and
   wherein an existing module is replaced by the first extended module, and the extended function module and the second extended module are added for function extension of the core printer driver in the selected client apparatus.

6. A computer-readable medium encoded with a computer program instructing a computer to perform a remote install method according to claim 1.

* * * * *